United States Patent
Liang et al.

(10) Patent No.: US 7,046,228 B2
(45) Date of Patent: *May 16, 2006

(54) ELECTROPHORETIC DISPLAY WITH DUAL MODE SWITCHING

(75) Inventors: Rong-Chang Liang, Cupertino, CA (US); Jerry Chung, Mountain View, CA (US); David Chen, Buena Park, CA (US)

(73) Assignee: SiPix Imaging, Inc., Fremont, CA (US)

( * ) Notice: Subject to any disclaimer, the term of this patent is extended or adjusted under 35 U.S.C. 154(b) by 144 days.

This patent is subject to a terminal disclaimer.

(21) Appl. No.: 10/222,036

(22) Filed: Aug. 16, 2002

(65) Prior Publication Data

US 2003/0034950 A1    Feb. 20, 2003

Related U.S. Application Data

(60) Provisional application No. 60/313,146, filed on Aug. 17, 2001.

(51) Int. Cl.
G09G 3/34    (2006.01)

(52) U.S. Cl. ............................ 345/107; 345/84; 345/85

(58) Field of Classification Search ................ 345/107, 345/86, 173, 205, 84, 85, 48; 359/296, 267; 204/600, 478, 485; 430/20
See application file for complete search history.

(56) References Cited

U.S. PATENT DOCUMENTS

| | | | |
|---|---|---|---|
| 3,612,758 A | 10/1971 | Evans et al. | 178/5.4 R |
| 3,668,106 A | 6/1972 | Ota | 204/299 |
| 3,697,679 A | 10/1972 | Hathaway | 178/6.6 A |
| 3,892,568 A | 7/1975 | Ota | 96/13 |
| 4,071,430 A | 1/1978 | Liebert | 204/299 |
| 4,093,534 A | 6/1978 | Carter et al. | 350/355 |
| 4,285,801 A | 8/1981 | Chiang | 204/299 |
| 4,298,448 A * | 11/1981 | Muller et al. | 359/296 |
| 4,680,103 A | 7/1987 | Beilin Solomon I. et al. | 204/299 |
| 4,741,988 A | 5/1988 | Van der Zande et al. | 430/312 |

(Continued)

FOREIGN PATENT DOCUMENTS

EP    1 089 118 A2    4/2001

(Continued)

OTHER PUBLICATIONS

Cominsky, B. et al., "An Electrophoretic Ink For All-Printed Reflective Electronic Displays", Letters to Nature, pp. 253-255 (1998).

(Continued)

*Primary Examiner*—Vijay Shankar
*Assistant Examiner*—Prabodh Dharia
(74) *Attorney, Agent, or Firm*—Howrey LLP

(57) ABSTRACT

The present invention relates to an improved EPD which comprises both the traditional up/down switching and the in-plane switching modes. In other words, the improved EPD has dual switching modes.

The monochrome EPDs of the present invention are capable of displaying highlight color of choice which is different from the text. For example, white background, blue text, and red highlight can be shown in any selected areas of the display. Furthermore, the full color EPDs of the present invention are capable of displaying high contrast images of high color saturation. Both high quality black and white states are possible in the full color displays of the present invention. The EPDs of the present invention do not need complex circuitry design, and are compatible with low cost and high yield roll-to-roll manufacturing processes.

51 Claims, 15 Drawing Sheets

U.S. PATENT DOCUMENTS

| | | | |
|---|---|---|---|
| 4,995,718 A | 2/1991 | Jachimowicz et al. | 353/31 |
| 5,132,820 A | 7/1992 | Someya et al. | 349/43 |
| 5,276,438 A | 1/1994 | DiSanto et al. | 345/107 |
| 5,279,511 A | 1/1994 | DiSanto et al. | 445/24 |
| 5,345,251 A | 9/1994 | DiSanto et al. | |
| 5,378,574 A * | 1/1995 | Winnik et al. | 430/115 |
| 5,380,362 A | 1/1995 | Schubert | 106/493 |
| 5,403,518 A | 4/1995 | Schubert | 252/572 |
| 5,573,711 A | 11/1996 | Hou et al. | 252/272 |
| 5,589,100 A | 12/1996 | Grasso et al. | 252/299.01 |
| 5,699,097 A | 12/1997 | Takayama et al. | 347/171 |
| 5,745,094 A | 4/1998 | Gordon, II et al. | |
| 5,835,174 A | 11/1998 | Clikeman et al. | 349/86 |
| 5,892,497 A | 4/1999 | Robertson | |
| 5,914,806 A | 6/1999 | Gordon, II et al. | 359/296 |
| 5,930,026 A | 7/1999 | Jacobson et al. | 359/296 |
| 5,961,804 A | 10/1999 | Jacobson et al. | 204/606 |
| 5,976,405 A | 11/1999 | Clikeman et al. | 252/299.01 |
| 5,980,719 A * | 11/1999 | Cherukuri et al. | 204/600 |
| 5,982,346 A | 11/1999 | Sheridon et al. | |
| 6,017,584 A | 1/2000 | Albert et al. | 427/213.3 |
| 6,037,058 A | 3/2000 | Clikeman et al. | 428/402.2 |
| 6,067,185 A | 5/2000 | Albert et al. | 359/296 |
| 6,111,598 A | 8/2000 | Faris | 348/57 |
| 6,113,810 A | 9/2000 | Hou et al. | 252/572 |
| 6,120,588 A | 9/2000 | Jacobson | 106/31.16 |
| 6,120,839 A | 9/2000 | Comiskey | 427/213.3 |
| 6,172,798 B1 | 1/2001 | Albert et al. | 359/296 |
| 6,184,856 B1 | 2/2001 | Gordon, II et al. | 345/107 |
| 6,198,809 B1 * | 3/2001 | Disanto et al. | 379/93.23 |
| 6,252,624 B1 | 6/2001 | Yuasa et al. | 348/56 |
| 6,312,304 B1 | 11/2001 | Duthaler et al. | 445/24 |
| 6,327,072 B1 | 12/2001 | Comiskey et al. | 359/296 |
| 6,337,761 B1 * | 1/2002 | Rogers et al. | 359/296 |
| 6,373,461 B1 * | 4/2002 | Hasegawa et al. | 345/107 |
| 6,377,387 B1 | 4/2002 | Duthaler et al. | |
| 6,392,786 B1 | 5/2002 | Albert | 359/296 |
| 6,445,374 B1 | 9/2002 | Albert et al. | |
| 6,525,865 B1 | 2/2003 | Katase | |
| 6,538,801 B1 * | 3/2003 | Jacobson et al. | 359/296 |
| 6,549,327 B1 | 4/2003 | Foucher et al. | |
| 6,611,100 B1 | 8/2003 | Moore | |
| 6,639,580 B1 | 10/2003 | Kishi et al. | |
| 6,650,462 B1 | 11/2003 | Katase | |
| 6,693,620 B1 * | 2/2004 | Herb et al. | 345/107 |
| 6,704,133 B1 * | 3/2004 | Gates et al. | 359/296 |
| 6,721,083 B1 | 4/2004 | Jacobson et al. | |
| 6,729,718 B1 * | 5/2004 | Goto et al. | 347/100 |
| 6,750,844 B1 | 6/2004 | Nakanishi | |
| 6,751,007 B1 | 6/2004 | Liang et al. | |
| 6,829,078 B1 | 12/2004 | Liang et al. | |
| 6,859,302 B1 | 2/2005 | Liang et al. | |
| 2001/0008241 A1 | 7/2001 | Moore | |
| 2001/0009352 A1 | 7/2001 | Moore | |
| 2002/0033792 A1 * | 3/2002 | Inoue | 345/107 |
| 2002/0036616 A1 | 3/2002 | Inoue | |
| 2002/0089495 A1 | 7/2002 | Matsuura et al. | |
| 2002/0126249 A1 | 9/2002 | Liang et al. | 349/187 |
| 2002/0150827 A1 | 10/2002 | Kawai et al. | |
| 2002/0171620 A1 * | 11/2002 | Gordon et al. | 345/107 |
| 2002/0182544 A1 | 12/2002 | Chan-Park et al. | 430/311 |
| 2002/0188053 A1 | 12/2002 | Zang et al. | 524/474 |
| 2003/0002132 A1 * | 1/2003 | Foucher et al. | 359/296 |
| 2003/0095094 A1 * | 5/2003 | Goden | 345/107 |
| 2003/0107631 A1 * | 6/2003 | Goto et al. | 347/100 |
| 2003/0132908 A1 * | 7/2003 | Herb et al. | 345/107 |
| 2004/0051935 A1 * | 3/2004 | Katase | 359/296 |
| 2004/0113884 A1 * | 6/2004 | Albert et al. | 345/107 |
| 2004/0136048 A1 * | 7/2004 | Arango et al. | 359/296 |
| 2004/0179259 A1 | 9/2004 | Fujii et al. | |
| 2004/0190115 A1 * | 9/2004 | Liang et al. | 359/296 |
| 2004/0201567 A1 | 10/2004 | Yu et al. | |
| 2005/0007651 A1 * | 1/2005 | Liang et al. | 359/296 |

FOREIGN PATENT DOCUMENTS

| | | |
|---|---|---|
| JP | S49-005598 | 1/1974 |
| JP | S49-24695 | 3/1974 |
| JP | 59-171930 | 9/1984 |
| JP | 11-202804 | 7/1999 |
| WO | WO 99/53373 | 10/1999 |
| WO | WO 99/56171 | 11/1999 |
| WO | WO 00/60410 | 10/2000 |
| WO | WO 01/67170 | 9/2001 |
| WO | WO 02/073304 | 9/2002 |
| WO | WO 02/073304 | 11/2002 |
| WO | PCT/US04/04711 | 12/2004 |
| WO | PCT/US04/04835 | 12/2004 |

OTHER PUBLICATIONS

Dalisa, A.L., "Electrophoretic Display Technology", IEEE Transactions of Electron Devices, Jul. 1997, pp. 827-834.

Drzaic, P., "Liquid Crystal Dispersion", The PDLC Paradigm, (1995), pp. 1-9.

Harvey, T.G. "Replication Techniques For Micro-Optics", SPIE, vol. 3099, pp. 76-82 (1997).

Hopper, M.A. and Novotny, V., "An Electrophoretic Display, It's Properties, Model, and Addressing" IEEE Transactions on Electron Devices, vol. ED-26, No. 8, Aug. 1979, pp. 1148-1152.

Harbour, J.R. et al., "Subdivided Electrophoretic Display", Xerox Disclosure Journal, vol. 4, No. 6 (1979).

Lewis, J.C., et al., "Gravitational, Inter-Particle-Electrode Forces in Electrophoretic Display", Proceedings of the S.I. D., vol. 18/3&4 (1977).

Murau, P., et al., "The Understanding and Elimination of Some Suspension Instabilities in an Electrophoretic Display", J. Appl. Phys., 49(9), (1978).

Nakamura, E., et al., "Development of Electrophoretic Display Using Microcapsulated Suspension", SID DIGEST, (1998), pp. 1014-1017.

Ota, I., et al., "Electrophoretic Image Display EPID Panel", Proceedings of the IEEE, vol. 1, No. 7, Jul. 1973.

Singer, B. and Dalisa, A.L., "An X-Y Addressable Electrophoretic Display", Proceeding of the S.I.D., vol. 18/3&4, (1977).

Slafer, D.W., et al., "Continuous Manufacturing of Thin Cover Sheet Optical Media", SPIE, vol. 1663, (1992), pp. 323-335.

Kishi, E., et al., "5.1: Development of In-Plane EPD", Canon Research Center, SID 00' Digest, pp. 24-27.

Swanson, S.A. et al., "5.2: High Performance EPD's", IBM Almaden Research Center, SID 00' Digest, pp. 29-31.

U.S. Appl. No. 09/518,488, filed Mar. 3, 2000 (available upon request).

U.S. Appl. No. 09/606,654, filed Jun. 28, 2000 (available upon request).

U.S. Appl. No. 10/367,595, filed Mar. 2005, USPTO.

U.S. Appl. No. 10/367,098, filed Feb. 2003, Liang.

U.S. Appl. No. 10/367,670, filed Feb. 2003, Liang.

U.S. Appl. No. 10/367,098, filed Jan. 2005, USPTO.

Murau, P. "Characteristics of an X-Y Addressable Electrophoretic Image Display (EPID)", *SID Digest*, 141 (1984).

Singer, B., et al., "X-Y Addressable Electrophoretic Display", *Proceeding of the S.I.D.*, vol. 18/3 & 4, 255-266 (1977).

* cited by examiner

☐ RED
☒ GREEN
☰ BLUE
☐ WHITE

☐ RED
☒ GREEN
☰ BLUE
▦ BLACK

☐ RED
☒ GREEN
☰ BLUE
▦ BLACK

☐ RED
☒ GREEN
☰ BLUE
☐ WHITE

WHITE

YELLOW

BLACK

SIDE VIEW

TOP VIEW

SIDE VIEW

TOP VIEW

SIDE VIEW

TOP VIEW

SIDE VIEW

TOP VIEW

COLOR STATE

WHITE STATE

BLACK STATE

TOP VIEW

SIDE VIEW

COLOR STATE

COLOR STATE

WHITE STATE

WHITE STATE

BLACK STATE

BLACK STATE

TOP VIEW

SIDE VIEW

COLOR STATE

COLOR STATE

WHITE STATE

WHITE STATE

BLACK STATE

BLACK STATE

ELECTROPHORETIC DISPLAY WITH DUAL MODE SWITCHING

RELATED APPLICATION

This application claims the priority under 35 USC 119(e) of U.S. Provisional Application No. 60/313,146 filed Aug. 17, 2001.

BACKGROUND

The electrophoretic display (EPD) is a non-emissive device based on the electrophoresis phenomenon influencing charged pigment particles suspended in a solvent. This general type of display was first proposed in 1969. An EPD typically comprises a pair of opposed, spaced-apart and plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively are needed to drive the displays. In contrast, an array of thin film transistors (TFT) on the bottom plate and a non-patterned transparent conductor plate on the top viewing substrate are required for the active matrix type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus the color showing at the transparent plate may be determined by selectively charging the plates to be either the color of the solvent or the color of the pigment particles. Reversal of plate polarity will cause the particles to migrate back to the opposite plate, thereby reversing the color. Intermediate color density (or shades of gray) due to an intermediate level of pigment particles attracted to the transparent plate may be obtained by controlling the plate charge through a range of voltages. No backlight is needed in this type of reflective EPD display, although it may be optionally added to improve the display viewability in the dark.

EPDs of different pixel or cell structures have been reported previously, for example, the partition-type EPD (see M. A. Hopper and V. Novotny, *IEEE Trans. Electr. Dev.*, 26(8):1148–1152 (1979)) and the microencapsulated EPD (as described in U.S. Pat. No. 5,961,804 and U.S. Pat. No. 5,930,026). Each of these has its own problems as noted below.

In a partition-type EPD, there are partitions between the two electrodes for dividing the space into smaller cells in order to prevent undesired movements of the particles such as sedimentation. However, difficulties are encountered in the formation of the partitions, the process of filling the display with the fluid, enclosing the fluid in the display, and keeping the suspensions of different colors separated from each other. Even more difficult problems are encountered in the development of a roll-to roll manufacturing process for such a partition type of displays.

The microencapsulated EPD has a substantially two dimensional arrangement of microcapsules each having therein an electrophoretic composition of a dielectric fluid and a dispersion of charged pigment particles that visually contrast with the dielectric solvent. The microcapsules are typically prepared in an aqueous solution, and to achieve a useful contrast ratio, their mean particle size is relatively large (50–150 microns). The large microcapsule size results in a poor scratch resistance and a slow response time for a given voltage because a large gap between the two opposite electrodes is required for large capsules. Also, the hydrophilic shell of microcapsules prepared in an aqueous solution typically results in sensitivity to high moisture and temperature conditions. If the microcapsules are embedded in a large quantity of a polymer matrix to obviate these shortcomings, the use of the matrix results in an even slower response time and/or a lower contrast ratio. To improve the switching rate, a charge-controlling agent is often needed in this type of EPDs. However, the microencapsulation process in an aqueous solution imposes a limitation on the type of charge controlling agents that can be used. Other drawbacks associated with the microcapsule system include poor resolution and poor addressability for color applications.

U.S. Pat. No. 3,612,758 discloses another type of EPDs wherein the electrophoretic cells are formed from parallel line reservoirs containing charged pigment particles dispersed in a dielectric solvent. The channel-like electrophoretic cells are covered with, and in electric contact with, transparent conductors. A layer of transparent glass from which side the panel is viewed overlies the transparent conductors.

The use of microchannels, microgrooves or microcolumns to form the EPD array still has the problem of undesirable particle sedimentation or creaming along the column direction. In addition, the lack of a seamless, airpocket free and continuous sealing process to enclose the electrophoretic fluid in between the two electrodes makes the roll-to-roll manufacturing extremely difficult.

An improved EPD technology and a roll-to-roll manufacturing process were recently disclosed in co-pending applications, U.S. Ser. No. 09/518,488, filed on Mar. 3, 2000 (corresponding to WO01/67170), U.S. Ser. No. 09/759,212, filed on Jan. 11, 2001, U.S. Ser. No. 09/606,654, filed on Jun. 28, 2000 (corresponding to WO02/01281) and U.S. Ser. No. 09/784,972, filed on Feb. 15, 2001, all of which are incorporated herein by reference. The improved EPD comprises closed cells formed from microcups of well-defined shape, size and aspect ratio and filled with charged pigment particles dispersed in a dielectric solvent. This improved technology involving microcups allows high image quality in monochrome EPDs. A color display may also be manufactured by using a spatially adjacent array of small pixels formed of microcups filled with dyes of different colors (e.g., red, green or blue). However, there is a major deficiency in this type of system with only the traditional up/down switching mode, that is, the white light reflected from the "turned-off" colored pixels greatly reduces the color saturation of the "turned-on" color. More details in this regard are given in the following "Detailed Description" section.

While this latter deficiency may be remedied by an overlaid shutter device such as a polymer dispersed liquid crystal to switch the "off" pixels to the black state and keep the "on" pixels in the desired color state, the disadvantage of this approach is the high cost of the overlaid device, the high Dmin (which is the minimum optical density of the background) associated with the shutter device, and the complicated driving circuit design.

Alternatively, color displays of the normal up/down switching mode may be prepared by using color filters overlaid on the viewing side of the display. However, dark Dmin and lack of a high quality "white" state are the major problems for reflective color displays using color filters.

The "in-plane" switching concept was disclosed in E. Kishi, et al., "5.1: development of In-Plane EPD", Canon Research Center, SID 00 Digest, pages 24–27 and Sally A. Swanson, et al., "5.2: High Performance EPDs", IBM Almaden Research Center, SID 00 Digest, pages 29–31. In these prior art systems, the color effect is achieved by using a colored background with white or black particles. The disadvantage of these prior art systems is the lack of either high quality "white" or high quality "black" state. More details are also given in the "Detailed Description" section.

Thus, there is still a need for an improved EPD with high quality full color capability that can also be manufactured in an efficient manner, particularly by a roll-to-roll manufacturing process.

SUMMARY OF THE INVENTION

The present invention relates to an improved EPD which comprises both the traditional up/down switching and the in-plane switching modes. In other words, the improved EPD has dual switching modes.

The monochrome EPDs of the present invention are capable of displaying highlight color of choice which is different from the color of the text. For example, white background, blue text, and red highlight can be shown in any selected areas of the display. Furthermore, the full color EPDs of the present invention are capable of displaying high contrast images of high color saturation. Both high quality black and white states are possible in the full color displays of the present invention. The EPDs of the present invention do not need complex circuitry design, and are compatible with low cost and high yield roll-to-roll manufacturing processes.

BRIEF DESCRIPTION OF THE DRAWINGS

It is noted that all figures are shown as schematic and are not to scale.

DETAILED DESCRIPTION OF THE INVENTION

Unless defined otherwise in this specification, all technical terms are used herein according to their conventional definitions as they are commonly used and understood by those of ordinary skill in the art. The terms "well-defined", "aspect ratio" and "imagewise exposure" are as defined in the co-pending applications identified above.

It is understood that the scope of the present invention encompasses the conventional EPDs and EPDs manufactured from microcups, microchannels, microcapsules and the like.

The term "conventional EPD" refers to any electrophoretic cells known in the art. The electrophoretic cells may be of any shapes and sizes, and the displays include, for example, the partition type displays.

The term "microchannel" refers to, as an example, the type of electrophoretic cells disclosed in U.S. Pat. No. 3,612,758.

The term "microcup" refers to the cup-like indentations, which may be created by methods such as microembossing or imagewise exposure followed by a development step to remove the unexposed or exposed areas. Likewise, the plural form "microcups" in a collective context may in general refers to the microcup assembly comprising a plurality of such microcups integrally formed or joined to make a structured two-dimensional microcup array. The dimensions of the microcup are disclosed in the co-pending applications identified above.

I. The Disadvantages of Conventional EPDs (1) EPD with Only Up/Down Switching

Figure 1:
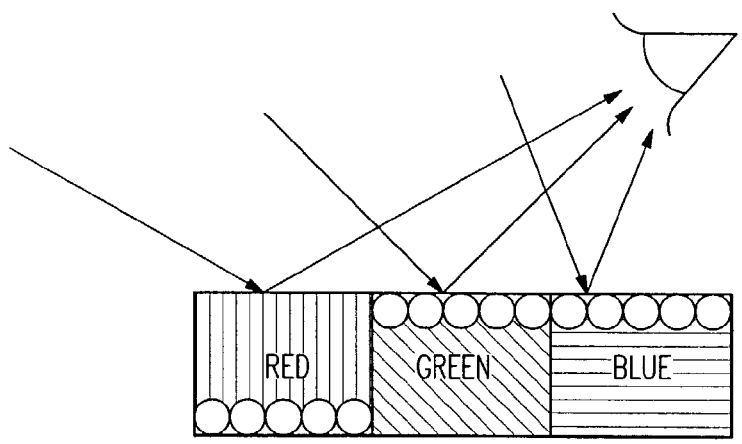
FIG. 1 illustrates the common deficiency of the traditional EPDs with only the up/down switching mode.

The EPD of FIG. 1 has only the up/down switching mode. The cells in the figure are filled with a suspension in which white positively charged particles are dispersed in a colored (red, green and blue) dielectric fluid. All three cells in FIG. 1 are shown charged with a voltage difference between the top and bottom electrodes (not shown). In the green and blue cells, the top electrode has a low voltage, the white positively charged particles in these two cells migrate to the top viewing electrode which is transparent, and as a result, the color of the particles (i.e., white) is reflected to the viewer through the transparent conductor film in the two cells. In the red cell, the bottom electrode has a low voltage; consequently the white positively charged particles migrate to the bottom of the cell, and the color of the medium (i.e., red) is seen through the top transparent conductor film. In the scenario as shown in FIG. 1, the white light reflected from the green and blue pixels greatly reduces the color saturation of the red pixel.

(2) EPD with Only the In-Plane Switching Mode

FIGS. 2A–2D illustrates the disadvantages of the prior art EPDs with only the in-plane switching mode.

Figure 2A:
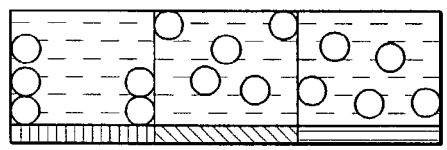
FIGS. 2A–2D illustrate the lack of true white or true black state in an EPD with only the in-plane switching mode.

In FIG. 2A, the cells are filled with a colorless dielectric solvent with white charged particles dispersed therein. The background of the cells is colored (i.e., red, green or blue). When there is a voltage difference between the in-plane electrodes, the white particles migrate to either side of the cell, and the color of the background (i.e., red, green or blue) is seen from the top transparent opening. When there is no voltage difference between the in-plane electrodes, the particles are scattered in the dielectric solvent, resulting in white color (i.e., the color of the particles) being seen from the top transparent opening. This arrangement of a colorless solvent, a colored background and white particles results in a display lack of a high density black state.

Figure 2B:
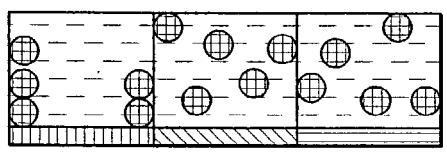

In FIG. 2B, the cells are filled with a colorless fluid with black particles dispersed therein. The background of the cells is colored (i.e., red, green or blue). When there is a voltage difference between the in-plane electrodes, the particles migrate to either side of the cell, and the color of the background (i.e., red, green or blue) is seen from the top transparent opening. When there is no voltage difference between the in-plane electrodes, the particles are scattered in the dielectric solvent, resulting in a black color (i.e., the color of the particles) being seen from the top transparent opening. This arrangement of solvent/background/particle colors results in a dirty white state with undesirable Dmin and contrast ratio.

Figure 2C:
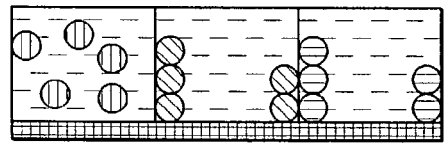

FIG. 2C shows the cells filled with a colorless fluid with colored particles (i.e., red, green or blue) dispersed therein. The background of the cells is black. When there is a voltage difference between the in-plane electrodes, the colored charged particles migrate to either side of the cell, and the color of the background (i.e., black) is seen from the top transparent opening. When there is no voltage difference between the in-plane electrodes, the colored particles are scattered in the dielectric solvent, resulting in the color of the particles (i.e., red, green or blue) being seen from the top transparent opening. In this design, the black state is of high quality. However, no high quality white state is possible. As a result, the reflective display of this type appears to have a dirty background or a low degree of reflection in the Dmin area.

Figure 2D:
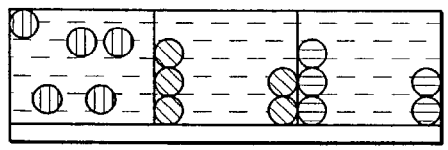

In FIG. 2D, the cells are filled with a colorless fluid with colored particles (red, green or blue) dispersed therein. The background of the cells is white. When there is a voltage difference between the in-plane electrodes, the particles migrate to either side of the cell, and the color of the background (i.e., white) is seen from the top transparent opening, resulting in a high quality white state. When there is no voltage difference between the in-plane electrodes, the particles are scattered in the fluid, resulting in the color of the particles (i.e., red, green or blue) being seen from the top transparent opening. No high quality black state is available in this design.

In summary, the in-plane only switching mode results in either a reflective color display having no high quality black state or a display having no high quality white state. Contrast ratio and color saturation are poor in this type of in-plane switching, reflective color displays. In all in-plane switching EPDs, the substrate on the opposite side of the in-plane electrodes is typically a transparent insulator, which usually is the viewing side of the display.

II. Electrophoretic Display of the Present Invention

Figure 3:
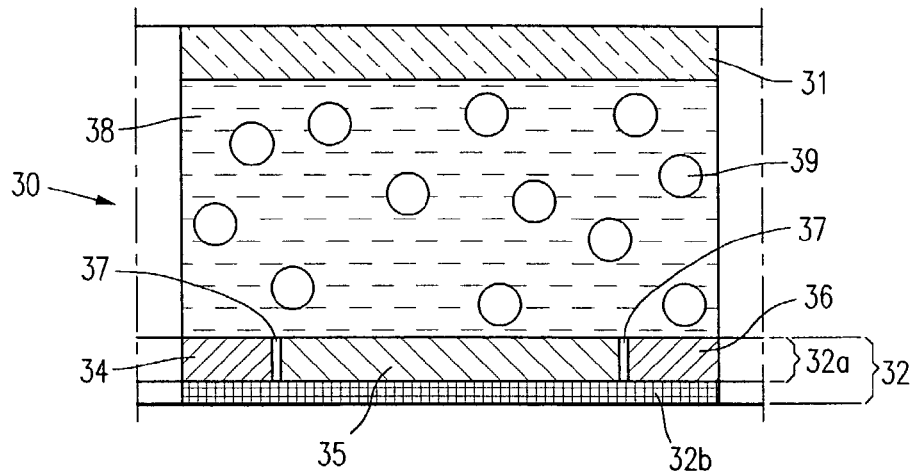
FIG. 3 illustrates a typical electrophoretic cell of the present invention and the general locations of the up/down and in-plane switching electrodes.

FIG. 3 illustrates a side view of a typical electrophoretic cell of the present invention. While only a cup-like cell is depicted, it is understood that the scope of the present invention encompasses cells formed from microchannels and the like, and all types of conventional electrophoretic cells.

The cell (30) is sandwiched between a top (31) and a bottom layer (32). The top layer contains a transparent top electrode (not shown). The bottom layer (32) consists of a layer (32a) comprising an in-plane switching electrode (34) on the left-hand side, a bottom electrode (35) and another in-plane electrode (36) on the right-hand side and optionally a colored background layer (32b). There is a gap (37) to separate the two in-plane electrodes (34, 36) from the bottom electrode (35).

The background layer (32b) may be on top of the electrode layer (32a) (not shown), or underneath the electrode layer (32a). Alternatively, the layer 32a may serve as the background layer and in this case, the layer 32a may be black or of other colors.

Another alternative is that the bottom layer may have only one in-plane switching electrode, and one bottom electrode with a gap in between.

Typically, the cells in FIG. 3 are filled with a clear, but colored (i.e., red, green or blue) dielectric solvent (38) with white particles (39) dispersed therein, and the background color of the cells is typically black. The particles may be positively or negatively charged. For the purpose of illustration, it is assumed that the particles are positively charged throughout this application.

The charged particles in the individual cells of a display may be of the same color or of different colors. The individual cells may also be filled with an electrophoretic fluid containing charged particles of mixed colors.

Figure 4A:
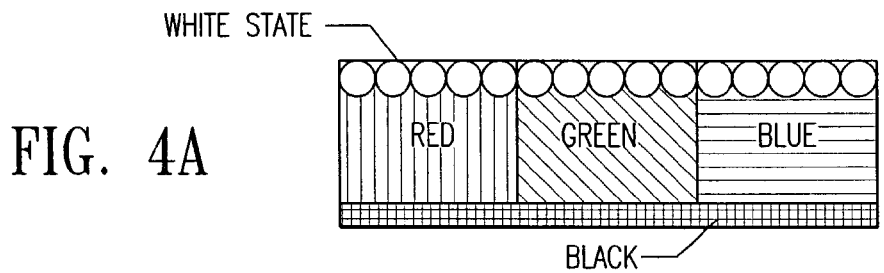
FIGS. 4A–4C illustrate the various possible scenarios of the improved EPD with dual modes.
Figure 4B:
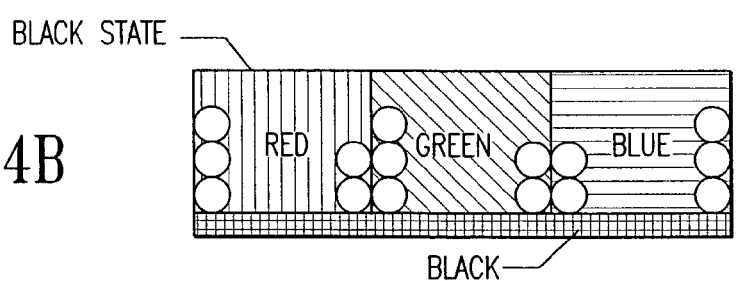
Figure 4C:
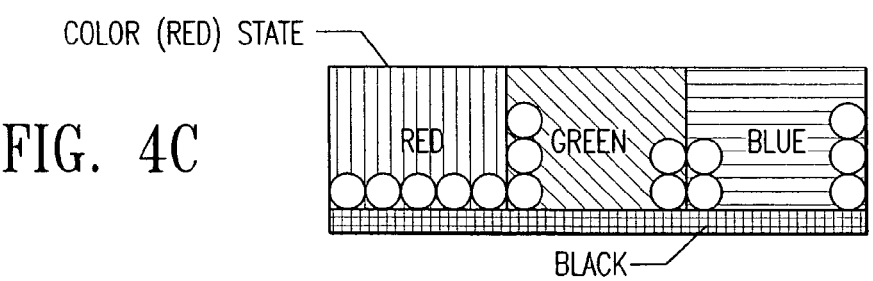

As shown in FIGS. 4A–4C, the dual switching mode allows the particles to move in either the vertical (up/down) direction or the planar (left/right) direction. For example, in FIG. 4A, the voltage of the top electrode is set low, and the voltages of the bottom electrode and the in-plane electrodes are set high. The white particles migrate to and gather at the top transparent conductor film, and the white color (i.e., the color of the particles) is seen by the viewer.

In FIG. 4B, the in-plane electrodes are set at low voltages, and the top and the bottom electrodes are set at high voltages. In this scenario, the white particles migrate to the sides of the cells, the color seen through the top transparent conductor film therefore is the color of the background (i.e., black).

In FIG. 4C, when the voltage of the top electrode is set high, the voltage of the bottom electrode is set low, and the in-plane electrodes are set at low voltage, the white particles migrate to the bottom of the cells. In this scenario, the color of the fluid (i.e., red, green or blue) is seen by the viewer through the top transparent conductor film as shown in the red cell of FIG. 4C. To present a red pixel in a full color display, the white particles in the green and blue cells may be either attracted to the sides as shown in FIG. 4C or to the top (not shown). The former is preferred because it typically exhibits a better color saturation than the latter. Thus the dual switching mode technology gives the first full-color EPD wherein all colors including red, green, blue, black and white of high quality are available in the same device.

Furthermore, the background color may be of any color (e.g., cyan, yellow or magenta) instead of the commonly used black color. For example, the cells of FIG. 3 may be filled with a red clear dielectric solvent with white positively charged particles dispersed therein and the background color of the cells may be yellow. In this case, when the particles migrate to the top, the white color (i.e., the color of the particles) is seen by the viewer and when the particles migrate to cover the bottom of the cells, the color of the medium (i.e., red) is seen through the transparent conductor. However, when the white particles migrate to the sides of the cells, the color seen through the top transparent conductor film, will be a shade of orange.

Other shades or color tones may be achieved by using different particle/medium/background color combinations, for example, white/red/cyan, white/red/magenta, white/blue/yellow, white/blue/cyan, white/blue/magenta, white/green/yellow, white/green/cyan, white/blue/magenta, etc.

The preferred combination to achieve a full color display is white particles, black background, and fluids separately colored with an additive primary color (i.e., red, green or blue).

Figure 4D:
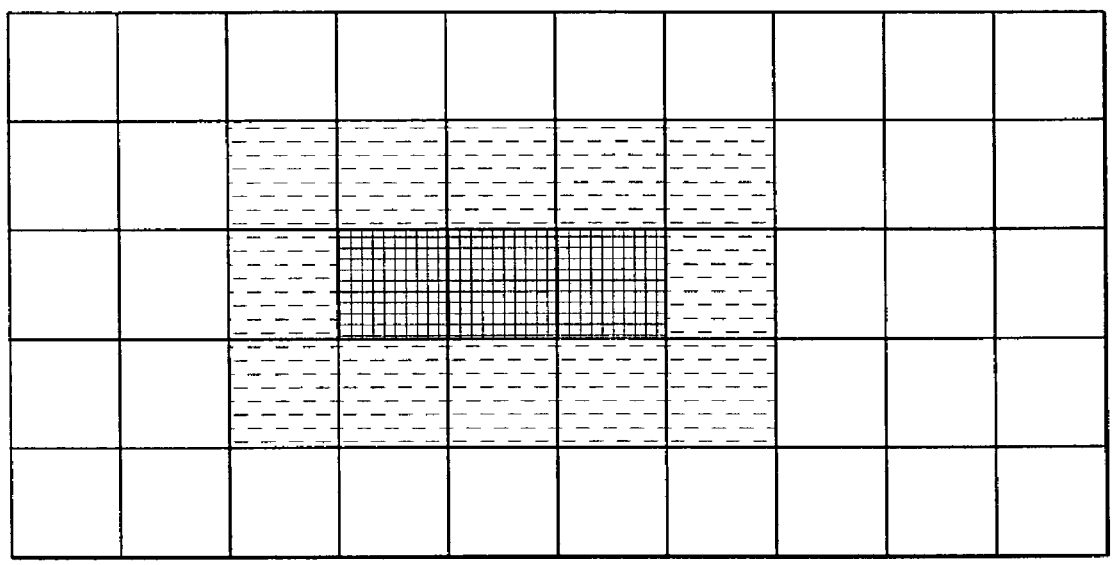
FIG. 4D illustrates the highlight option of the present invention (top view).
Figure 4D:
Figure 4D:
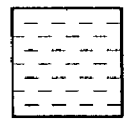
Figure 4D:
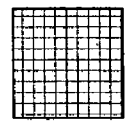

A further aspect of the invention is a monochrome display with highlight options. In such a case, all cells in the display have the same background color and are filled with the same electrophoretic fluid (i.e., having the same particle/solvent color combination). For example, the display may have white particles, the solvent is one of the primary colors (red, green or blue) and the background color is a color contrasting the solvent color. This arrangement is useful for a relatively simple two color device with a colored highlight option. For example, an EPD having white particles, a yellow dielectric solvent, and a black background can display at least three different colors in each cell or pixel as shown in FIG. 4D (top view). When the white particles are all attracted to the top viewing electrode, the white color is seen. When the white particles are uniformly attracted to the bottom electrodes, the yellow color is seen through the top viewing electrode. When the white particles are attracted to the in-plane electrode on either side of the cell, the black color is seen through the top viewing electrode. Intermediate colors are also possible if the particles are driven to intermediate states. This highly desirable feature of highlight capability in any pixels of the display can be realized by using the dual switching mechanism of this invention to drive a low cost monochrome EPD having pre-selected colors for the particles, the solvent and the background.

In summary, the EPDs of the present invention with the dual switching mode can provide the previously unattainable high quality full color EPDs and a monochrome EPD with highlight color capability in any pixels of a monochrome display.

III. Preparation of Electrophoretic Cells of the Present Invention

The microcups generally may be manufactured by microembossing or photolithography as disclosed in U.S. Ser. No. 09/518,488 filed Mar. 3, 2000 (corresponding to WO01/67170) and U.S. Ser. No. 09/784,972 filed on Feb. 15, 2001.

While only the cup-like cells are illustrated in the figures, it is understood that conventional electrophoretic cells and electrophoretic cells prepared from microchannels, microcolumns and the like are also within the scope of the present invention.

III(a) Preparation Of The Microcup Array by Microembossing Preparation of the Male Mold The male mold may be prepared by any appropriate method, such as a diamond turn process or a photoresist process followed by either etching or electroplating after the resist is developed. A master template for the male mold may be manufactured by any appropriate method, such as electroplating. With electroplating, a glass base is sputtered with a thin layer (typically 3000 Å) of a seed metal such as chrome inconel. It is then coated with a layer of photoresist and exposed to UV. A mask is placed between the UV and the layer of photoresist. The exposed areas of the photoresist become hardened. The unexposed areas are then removed by washing them with an appropriate solvent. The remaining hardened photoresist is dried and sputtered again with a thin layer of seed metal. The master is then ready for electroforming. A typical material used for electroforming is nickel cobalt. Alternatively, the master can be made of nickel by electroforming or electroless nickel deposition as described in "Continuous manufacturing of thin cover sheet optical media", *SPIE Proc.* 1663:324 (1992). The floor of the mold is typically between about 50 to 400 microns thick. The master can also be made using other microengineering techniques including e-beam writing, dry etching, chemical etching, laser writing or laser interference as described in "Replication techniques for micro-optics", *SPIE Proc.* 3099: 76–82 (1997). Alternatively, the mold can be made by diamond turning or photomachining using plastics, ceramics or metals.

The male mold thus prepared typically has protrusions between about 3 to 500 microns, preferably between about 5 to 100 microns, and most preferably about 10 to 50 microns, and can be of any shape like round, square, or of other geometry. The male mold may be in the form of a belt, a roller, or a sheet. For continuous manufacturing, the belt or the roller type of mold is preferred. Prior to applying a UV curable resin composition, the mold may be treated with a mold release to aid in the demolding process. To further improve the demolding process, the conductor film may be precoated with a primer or an adhesion promoting layer to improve the adhesion between the conductor and the microcups.

Microcups may be formed either in a batchwise process or in a continuous roll-to-roll process as described in U.S. Ser. No. 09/784,972 filed on Feb. 15, 2001.

In the first step of the microembossing process, a UV curable resin is typically coated on a transparent patterned conductor film, by any appropriate means, such as roller coating, die coating, slot coating, slit coating, doctor blade coating and the like. The conductor film is usually prepared by sputtering coating on a plastic substrate such as polyethylene terephthalate, polyethylene naphthate, polyaramid, polyimide, polycycloolefin, polysulfone and polycarbonate. The radiation curable material used is a thermoplastic or thermoset precursor, such as multifunctional acrylate or methacrylate, vinylether, epoxide, their oligomers or polymers and the like. Multifunctional acrylates and their oligomers are the most preferred. A combination of a multifunctional epoxide and a multifunctional acrylate is also very useful to achieve desirable physico-mechanical properties. The UV curable resin may be degassed prior to dispensing and may optionally contain a solvent. The solvent, if present, readily evaporates.

The radiation curable material coated on the conductor film/substrate is embossed by the male mold under pressure. If the male mold is metallic and opaque, the conductor film/substrate is typically transparent to the actinic radiation used to cure the resin. Conversely, the male mold can be transparent and the conductor film/substrate can be opaque to the actinic radiation.

After exposure to radiation, the radiation curable material becomes hardened. The male mold is then released from the microcups formed.

III(b) Preparation of Microcup Array by Photolithography

Figure 5A:
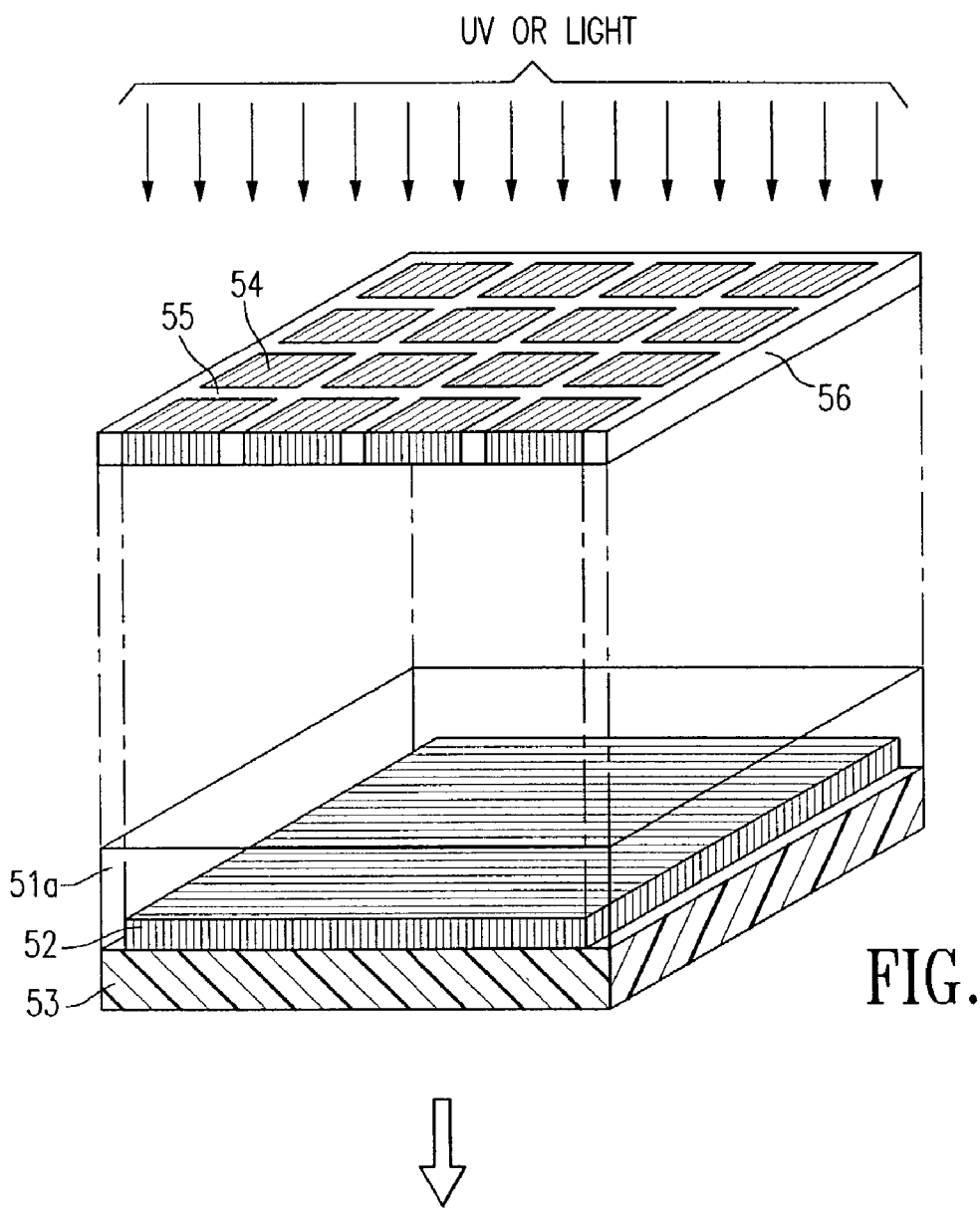
FIGS. 5A and 5B illustrate the manufacture of microcups involving imagewise photolithographic exposure through photomask.
Figure 5B:
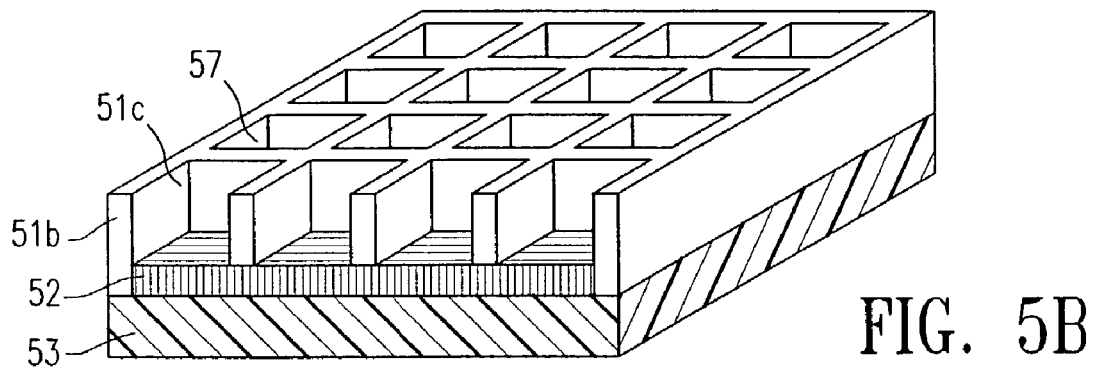

The photolithographic process for preparation of the microcup array is shown in FIGS. 5A and 5B.

As shown in FIGS. 5A and 5B, the microcup array may be prepared by exposure of a radiation curable material (51a), coated by any known methods onto a transparent patterned conductor film (52), to UV light (or alternatively other forms of radiation, electron beams and the like) through a mask (56) to form walls (51b) corresponding to the image projected through the mask (56). The conductor film (52) is on a plastic substrate (53).

In the photomask (56) in FIG. 5A, the dark squares (54) represent the area opaque to the radiation employed, and the space (55) between the dark squares represents the radiation-transparent area. The UV radiates through the opening area (55) onto the radiation curable material (51a).

As shown in FIG. 5B, the exposed areas (51b) become hardened and the unexposed areas (protected by the opaque area (54) of the mask (56)) are then removed by an appropriate solvent or developer to form the microcups (57). The solvent or developer is selected from those commonly used for dissolving or dispersing radiation curable materials such as methylethylketone, toluene, acetone, isopropanol or the like.

Alternatively, the exposure can be done by placing the photomask underneath the conductor film/substrate. In this case, the conductor film/substrate must be transparent to the radiation wavelength used for exposure.

The openings of the microcups prepared according to the methods described above may be round, square, rectangular, hexagonal or any other shape. The partition area between the openings is preferably kept small in order to achieve a high color saturation and contrast while maintaining desirable mechanical properties. Consequently, the honeycomb-shaped opening is preferred over, for example, the circular opening.

For reflective electrophoretic displays, the dimension of each individual microcup may be in the range of about $10^2$ to about $1\times10^6$ $\mu m^2$, preferably from about $10^3$ to about $1\times10^5$ $\mu m^2$. The depth of the microcups is in the range of about 5 to about 200 microns, preferably from about 10 to about 100 microns. The opening to the total area ratio, total area being defined as that of one microcup including walls measured from wall centers, is in the range of from about 0.05 to about 0.95, preferably from about 0.4 to about 0.9.

The colored background layer of the cells may be added by painting, printing, coating or laminating a colored layer to the bottom layer.

III(c) Preparation of the Suspensions

The cells are filled with charged pigment particles dispersed in a dielectric solvent and that migrate under the influence of an electric field. The suspensions may optionally contain additional colorants that do not migrate in the electric field. The dispersion may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, and 3,668,106. See also *IEEE Trans. Electron Devices*, ED-24, 827 (1977), and *J. Appl. Phys.* 49(9):4820 (1978).

The dielectric solvent preferably has a low viscosity and a dielectric constant in the range of about 2 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, halogenated solvents such as, dichlorobenzotrifluoride, 3,4,5-trichlorobenzotrifluoride, chloropentafluoro-benzene, dichlorononane, pentachlorobenzene, and perfluorinated solvents such as perfluorodecalin, perfluorotoluene, perfluoroxylene, FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylethers such as Galden, HT-200, and Fluorolink from Ausimont or Krytox Oils and Greases K-Fluid Series from DuPont, Delaware. In one preferred embodiment, poly(chlorotrifluoroethylene) is used as the dielectric solvent. In another preferred embodiment, poly(perfluoropropylene oxide) is used as the dielectric solvent.

The contrasting colorant may be dyes or pigments. Nonionic azo and anthraquinone dyes are particularly useful. Examples of useful dyes include, but are not limited to: Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone reds 111 and 135, anthraquinone green 28 from Aldrich. Fluorinated dyes are particularly useful when perfluorinated solvents are used. In case of a contrasting pigment, the colorant of the medium may also be dispersed in the dielectric medium and are preferably uncharged. If the contrasting color pigment particles are charged, they preferably carry a charge which is opposite from that of the charged primary color pigment particles. If both the contrasting color and the primary color pigment particles carry the same charge, they should have different charge density or different electrophoretic mobility. The dyes or pigments used in EPDs must be chemically stable and compatible with other components in the suspension.

The charged primary color particles are preferably white, and may be organic or inorganic pigments, such as $TiO_2$.

If colored pigment particles are used, they may be selected from phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher. Particle size is preferably in the range of 0.01–5 microns, and is even more preferably in the range of 0.05–2 microns. The particles should have acceptable optical characteristics, should not be swollen or softened by the dielectric solvent, and should be chemically stable. The resulting suspension must also be stable against sedimentation, creaming or flocculation under normal operating conditions.

The migrating pigment particles may exhibit a native charge, or may be charged explicitly using a charge control agent, or may acquire a charge when suspended in the dielectric solvent. Suitable charge control agents are well known in the art; they may be polymeric or non-polymeric in nature, and may also be ionic or non-ionic, including ionic surfactants such as Aerosol OT, sodium dodecylbenzenesulfonate, metal soaps, polybutene succinimide, maleic anhydride copolymers, vinylpyridine copolymers, vinylpyrrolidone copolymer (such as Ganex from International Specialty Products), (meth)acrylic acid copolymers, and N,N-dimethylaminoethyl (meth)acrylate copolymers. Fluorosurfactants are particularly useful as charge controlling agents in perfluorocarbon solvents. These include FC fluorosurfactants such as FC-170C, FC-171, FC-176, FC430, FC431 and FC-740 from 3M Company and Zonyl fluorosurfactants such as Zonyl FSA, FSE, FSN, FSN-100, FSO, FSO-100, FSD and UR from DuPont.

Suitable charged pigment dispersions may be manufactured by any of the well-known methods including grinding, milling, attriting, microfluidizing and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the dielectric solvent may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation.

III(d) Filling and Sealing of the Microcups

The filling and sealing procedures are described in the co-pending applications, U.S. Ser. No. 09/518,488 (corresponding to WO01/67170) and U.S. Ser. No. 09/784,972 referred to in the previous sections, the disclosures of which are incorporated herein by reference in their entirety.

After the microcups are filled with an electrophoretic fluid, they are sealed. The critical step of sealing of the microcups may be accomplished in a number of ways. A preferred approach is to disperse a UV curable composition into an electrophoretic fluid comprising charged pigment particles dispersed in a colored dielectric solvent. The suitable UV curable materials include acrylates, methacrylates, styrene, alpha-methylstyrene, butadiene, isoprene, allylacrylate, polyvalent acrylate or methacrylate, cyanoacrylates, polyvalent vinyl including vinylbenzene, vinylsilane, vinylether, polyvalent epoxide, polyvalent isocyanate, polyvalent allyl and oligomers or polymers containing crosslinkable functional groups. The UV curable composition is immiscible with the dielectric solvent and has a specific gravity lower than that of the electrophoretic fluid, i.e. the combination of the dielectric solvent and the pigment particles. The two components, UV curable composition and the electrophoretic fluid, are thoroughly blended in an in-line mixer and immediately coated onto the microcups with a precision coating mechanism such as Myrad bar, gravure, doctor blade, slot coating or slit coating. Excess fluid is removed by a wiper blade or a similar device. A small amount of a weak solvent or solvent mixture such as heptane, isopropanol and methanol may be used to clean the residual electrophoretic fluid on the top surface of the partition walls of the microcups. Volatile organic solvents may be used to control the viscosity and coverage of the electrophoretic fluid. The thus-filled microcups are then dried and the UV curable composition floats to the top of the electrophoretic fluid. The microcups may be sealed by curing the supernatant UV curable layer during or after it floats to the top. The UV light or other forms of radiation such as visible light, IR or electron beam may be used to cure the sealing layer and seal the microcups. Alternatively, heat or moisture may also be employed to cure the sealing layer and seal the microcups, if a heat or moisture curable composition is used.

A preferred group of dielectric solvents exhibiting desirable density and solubility discrimination against acrylate monomers and oligomers are halogenated hydrocarbons, perfluorinated solvents such as perfluoroethers from Ausimont, Italy or Du Pont, Delaware, and their derivatives. Surfactants may be used to improve the adhesion and wetting at the interface between the electrophoretic fluid and the sealing materials. Surfactants include the FC surfactants from 3M Company, Zonyl fluorosurfactants from DuPont, fluoroacrylates, fluoromethacrylates, fluoro-substituted long chain alcohols, perfluoro-substituted long chain carboxylic acids and their derivatives.

Alternatively, the electrophoretic fluid and the sealing precursor may be filled sequentially into the microcups to prevent intermixing, particularly when the sealing precursor is at least partially compatible with the dielectric solvent. Thus, the sealing of the microcups may be accomplished by overcoating a thin layer of sealing material which is hardenable by radiation, heat, solvent evaporation, moisture or interfacial reactions on the surface of the filled microcups. Volatile organic solvents may be used to adjust the viscosity and the thickness of the coatings. When a volatile solvent is used in the overcoat, it is preferred that it is immiscible with the dielectric solvent to reduce the degree of intermixing between the sealing layer and the electrophoretic fluid. To further reduce the degree of intermixing, it is highly desirable that the specific gravity of the overcoating is significantly lower than that of the electrophoretic fluid. In the co-pending patent application, U.S. Ser. No. 09/874,391, filed Jun. 4, 2001, thermoplastic elastomers have been disclosed as the preferred sealing material.

Examples of useful thermoplastic elastomers include di-block, tri-block or multi-block copolymers represented by the formulas ABA or (AB)n in which A is styrene, α-methylstyrene, ethylene, propylene or norbonene; B is butadiene, isoprene, ethylene, proplyene, butylene, dimethoylsiloxane or propylene sulfide; and A and B cannot be the same in the formula. The number, n, is $\geq 1$, preferably 1–10. Representative copolymers include poly(styrene-b-butadiene), poly(styrene-b-butadiene-b-styrene), poly(styrene-b-isoprene-b-styrene), poly(styrene-b-ethylene/butylene-b-styrene), poly(styrene-b-dimethylsiloxane-b-styrene), poly((α-methylstyrene-b-isoprene), poly(α-methylstyrene-b-isoprene-b-α-methylstyrene), poly(α-methylstyrene-b-propylene sulfide-b-α-methylstyrene), and poly(α-methylstyrene-b-dimethylsiloxane-b-α-methylstyrene). Additives, such as silica particles and surfactants, may be used to improve the film integrity and coating quality.

Alternatively, interfacial polymerization followed by UV curing has been found very beneficial to the sealing process. Intermixing between the electrophoretic layer and the overcoat is significantly suppressed by the formation of a thin barrier layer at the interface by interfacial polymerization. The sealing is then completed by a post curing step, preferably by UV radiation. The two-step overcoating process is particularly useful when the dye used is at least partially soluble in the thermoset precursor.

III(e) Lamination of the Microcups

The sealed microcups are then laminated with the other electrode film preferably with an adhesive layer. Suitable adhesive materials include acrylic and rubber types of pressure sensitive adhesives, UV curable adhesives containing for example, multifunctional acrylates, epoxides, vinylethers or thiol-ene, and moisture or heat curable adhesives such as epoxy, polyurethane and cyanoacrylate.

In one embodiment of the invention, a substrate containing thin film transistors may be used as one of the bottom layer electrodes to also provide the active driving mechanism and the top electrode, in this scenario, is transparent.

IV. The Operations of the Dual Mode Switching

IV(a) Passive Matrix (1) Electrode Circuit Design

Figure 6A:
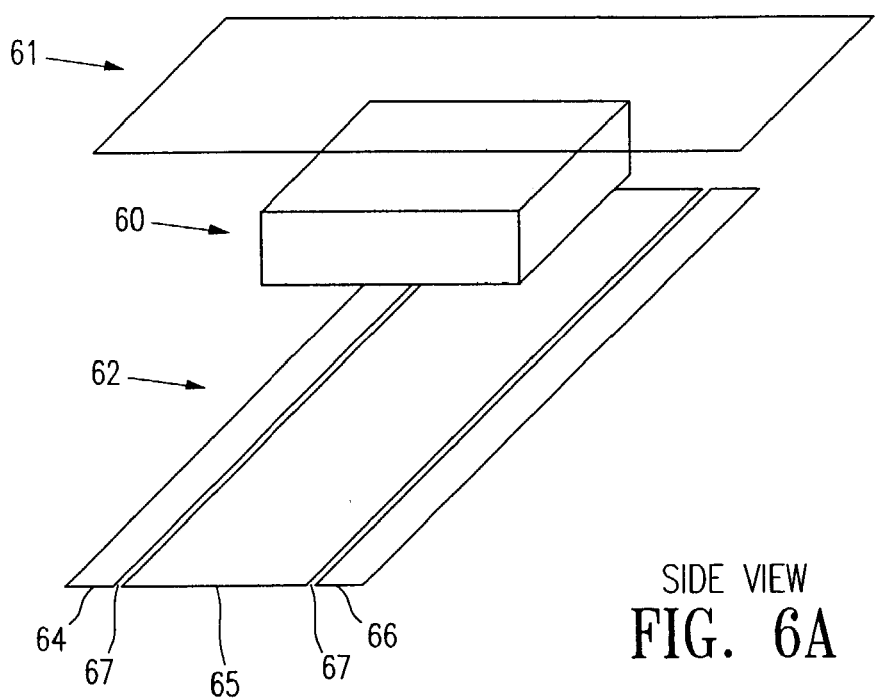
FIGS. 6A and 6B illustrate the two-layered ITO electrode system.
Figure 6B:
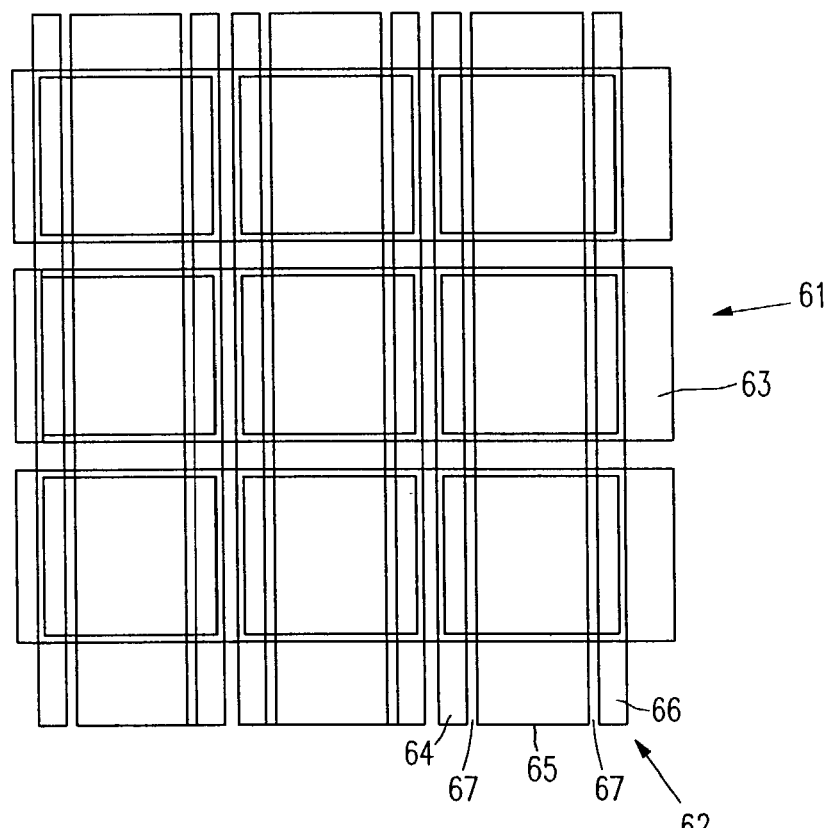

FIG. 6A is the side view of the two-layer passive matrix electrode circuit design. FIG. 6B shows the top view of a two-layer passive matrix electrode design for dual-mode. The cells (60) are sandwiched between one top layer (61) and a bottom layer (62). The horizontal bars are the row electrodes (63) that are transparent and run through the top of the cells. The bottom layer (62) consists of one in-plane electrode (64) that is on the left-hand side of the cell, one bottom column electrode (65) and another in-plane electrode (66) on the right-hand side. There are gaps (67) between the in-plane electrodes and between the in-plane electrodes and the column electrodes.

The cross section of the top row electrode, the bottom column electrode, and the in-plane electrodes define the display cell.

(2) Driving Timing Sequences

To illustrate the dual mode switching of this invention, electrophoretic cells comprising a common black background and positively charged white particles dispersed in a clear colored solvent are used.

A true white state may be generated by charging the top row electrodes (63) of selected cells or pixels with polarity opposite from that of the particles to draw the particles upward while charging the bottom column electrodes (65) and the in-plane electrodes (64) with the same polarity as the particles. The white color is seen through the top transparent conductor layer by the viewer.

Figure 7A:
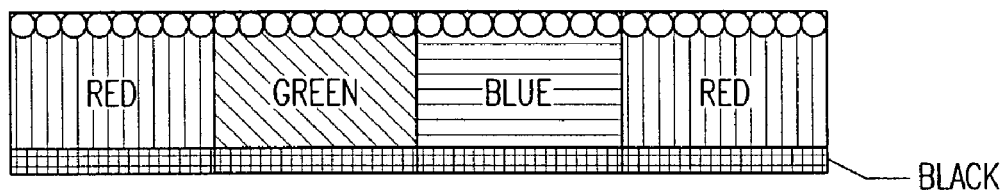
FIGS. 7A and 7B illustrate the true white state of the present invention, the top and cross-section views.
Figure 7B:
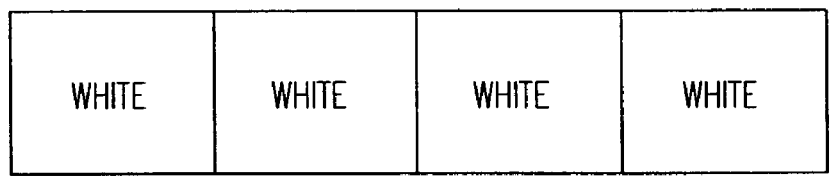

FIG. 7A is the cross-sectional view of an array of cells, which demonstrates the true white state. When the white particles in all cells migrate to the top of the cells, the resulting color (i.e., white) is seen from the top through the transparent conductor film (not shown). FIG. 7B is the top view of the array of cells showing the true white state.

A true black state can be achieved by, for example, a two-step driving process. In the first step, the voltage of the row electrode (63) is set high and the voltages of the column electrode (65) and the two in-plane electrodes (64) are set low. As a result, white particles are first attracted to the bottom of the cells. In the second step, the voltage of the in-plane electrodes is set low, the voltage of the column electrode is set high, and the row electrode is also set high. Under these settings, the white particles, driven by the electric field, migrate to and cover the sides of the cells, resulting in the black background color being seen through the top transparent conductor film.

Alternatively, a true black state can also be achieved by using a one-step driving process. More specifically, the black color may be seen by setting the row (63) and column (65) electrodes of the selected cells with high voltages, and the in-plane electrodes (64) at a low voltage. The voltages applied to the row and column electrodes may not be the same. This allows the electric field from both the top row electrode (63) and the bottom column electrode (65) to force the particles in the selected cells to move quickly towards the edges of the cells and results in a true black state of high quality.

Figure 8A:
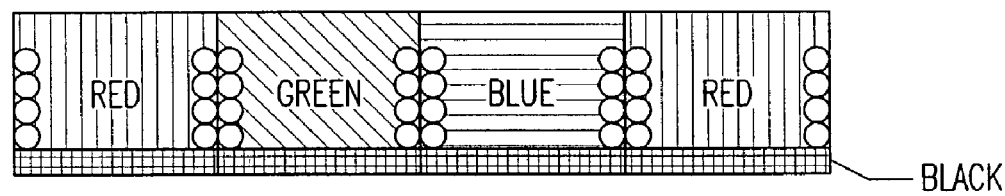
FIGS. 8A and 8B illustrate the true black state of the present invention, the top and cross-section views.
Figure 8B:
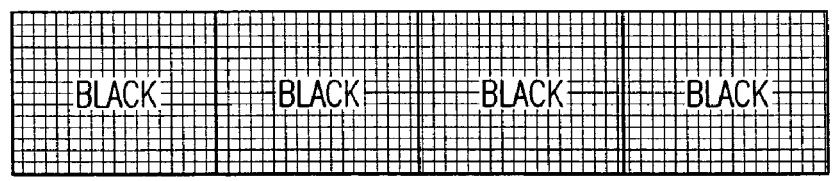

FIG. 8A is the cross-sectional view of the same array of cells (as was shown in FIG. 7A) to demonstrate the true black state of this invention. The white particles in all cells migrate to the sides of the cells, resulting in the color of the background (i.e., black) being seen from the top transparent conductor film. FIG. 8B is the top view of the array of cells showing the true black state.

A colored (e.g., red, blue, or green) state of the selected cells can be achieved when the voltage of a top (row) electrode (63) is set high, and the voltages of a column electrode (65) and the two in-plane electrodes (64) are set low. In this case, the white particles in the cell, driven by the electric field, migrate to the column electrode at the bottom. The bottom of the cells will be covered by the white particles and the color of the dielectric solvent (i.e., red, green or blue) is seen through the top transparent conductor layer. Any color combinations may be achieved according to the present invention by moving the charged white particles in selected cells of a pixel to the bottom. Gray scale can also be obtained by adjusting the voltage to partially move the particles to the bottom column electrodes.

Figure 9A:
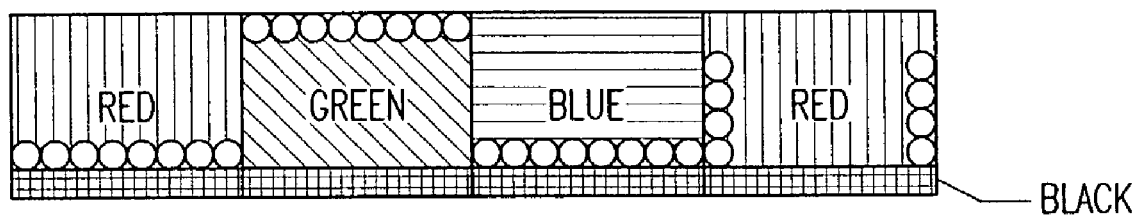
FIGS. 9A and 9B illustrate the multiple color state of the present invention, the top and cross-section views.
Figure 9B:
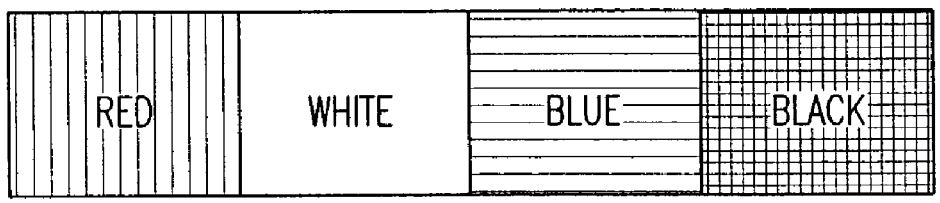

FIG. 9A is the cross-sectional view of the same array of cells (as shown in FIGS. 7A and 8A) to demonstrate the white, black and two color states in the same EPD display of the present invention. The cells with the white particles migrated to the top row electrodes (63) show the white color; the cells with the white particles migrated to bottom column electrodes (65) show the color of the dielectric solvent (i.e., red, green or blue); and the cells with the white particles migrated to the sides of the cells show the black color. FIG. 9B is the top view of the array of cells showing multiple colors.

Although the dual switching mode was illustrated above by using two in-plane electrodes (64) in a cell, the same results can also be achieved by using only one in-plane electrode or multiple in-plane electrodes.

IV(b) TFT Active Matrix (1) Electrode Circuit Design

Figure 10A:
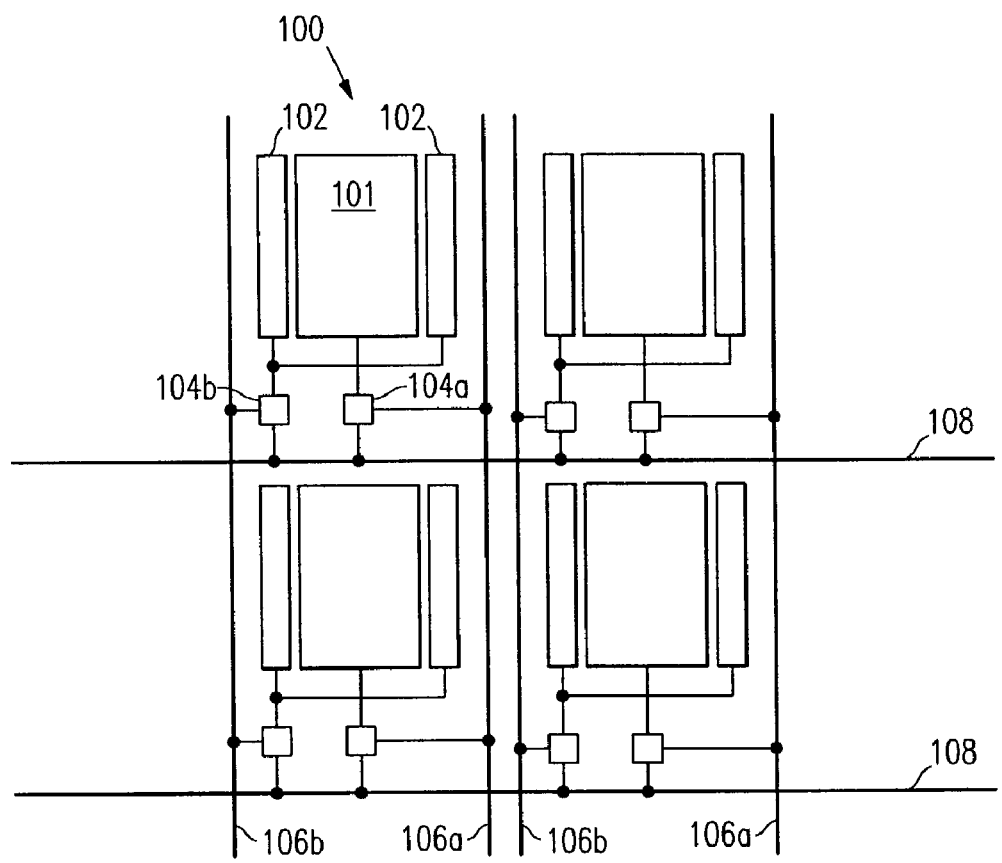
FIGS. 10A–10E illustrate the TFT active driving mechanism.
Figure 10B:
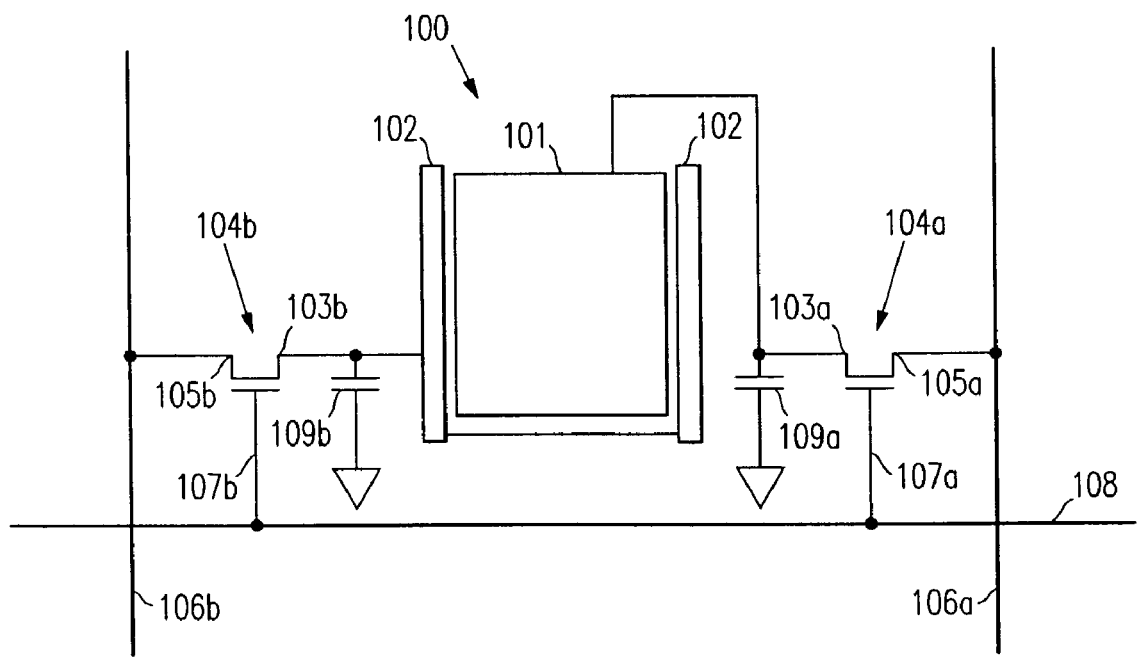

TFT (Thin Film Transistor) active matrix used in the LCD display system has been disclosed in U.S. Pat. No. 5,132,820. Such TFT technology can also be applied to the dual-mode EPD of the present invention. In a preferred embodiment, the top layer electrode made of a transparent conductive material, such as ITO, is in one piece which covers the entire top surface of the display. The top electrode connects to ground (0V). FIG. 10A shows the top view of the bottom electrode layer of a 2×2 array of cells. FIG. 10B shows the details of the TFT connection. Each cell (100) comprises one bottom electrode (101) and two in-plane electrodes (102). Each of the bottom electrodes connects to the source (103a) of a TFT (104a). The in-plane electrodes of each cell connect to the source (103b) of another TFT (104b). The drains (105a and 105b) of the TFTs (104a and 104b) connect to signal lines (106a and 106b) which run vertically through the bottom surface of the device. The gates (107a and 107b) of the TFTs (104a and 104b) connect to a scan line (108), which runs horizontally through the bottom surface of the device. The scan and signal lines form a matrix structure, but they are insulated from each other.

In the dual-mode switching, two TFTs (104a and 104b) are required for each cell to control the bottom electrode (101) and the in-plane electrodes (102) independently. When a row of cells (100) are scanned, the scan line (108) applies a voltage to the gates (107a and 107b) of the TFTs (104a and 104b) on that row of cells which turn on the TFTs. At the same time, signals for each electrode are applied at signal lines (106a and 106b), which are connected to the drains (105a and 105b) of the TFTs. These signals are then switched to the sources (103a and 103b) of the TFTs, which are connected to the bottom electrode and in-plane electrodes respectively. The signals form the desired bias condition of each cell. Signal capacitors (109a and 109b) are added to hold the voltages, so the voltages at the electrodes continue providing the bias to the cell even after the switching. This driving scheme speeds up the switching time dramatically. In addition, after the signal capacitors (109a and 109b) are charged, the driver can continue switching the next row. The switching time for each row of electrodes is only the charging time for the signal capacitors. This greatly reduces the response time of the display.

(2) Driving Timing Sequences

To illustrate the dual mode switching of this invention, electrophoretic cells comprising a common black background and positively charged white particles dispersed in a clear colored solvent are used.

Figure 10C:
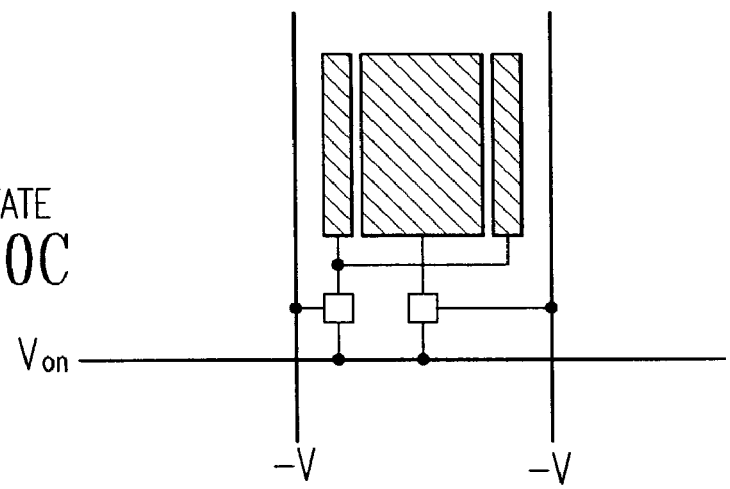

In a preferred embodiment, the top electrode of the device is permanently connected to ground (0V). As illustrated in FIG. 10C, the scan line is set at a voltage, Von, to turn on all the TFTs on the scanning row. Voltages at the signal lines are then switched to the bottom electrode and the in-plane electrodes. When the bottom electrode and in-plane electrodes are both set at a negative voltage, particles in the cell move to the bottom surface of the cell. The bottom of the cell will be covered by the white particles and the color of the dielectric solvent (i.e., red, green or blue) is seen through the top transparent conductor layer.

Figure 10D:
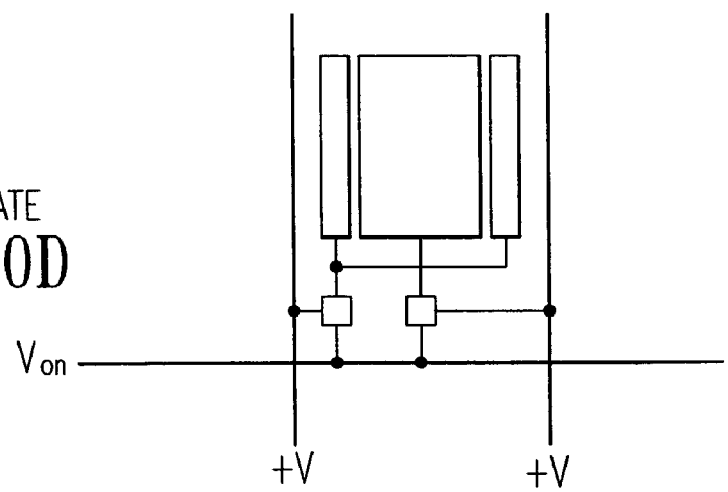

As illustrated in FIG. 10D, when the bottom electrode and in-plane electrodes are both set at a positive voltage, particles in the cell move to the top surface of the cell. When the white particles in the cell migrate to the top of the cell, the resulting white color is seen from the top through the conductor layer.

Figure 10E:
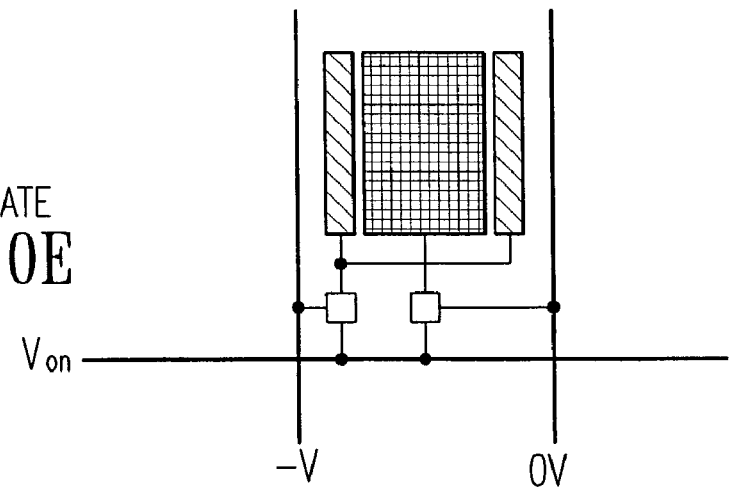

As illustrated in FIG. 10E, when the bottom electrode is set at 0V, and the in-plane electrodes are set at a negative voltage, particles move to the area of the small in-plane electrodes, resulting in the black background color being seen through the top transparent conductor film.

After a row of cells are scanned, the signal capacitors of each cell are charged according to the signal line voltage. When a row of cells are not being scanned, it is in the non-scan phase. During the non-scan phase, the electrode with a voltage set by the signal capacitor continues to generate the electric field and control the movement of particles.

The scan time limit of this design is determined by the signal capacitor discharge time. The capacitor needs to be refreshed (recharged) before the voltage drops more than 10% to maintain a good switching speed. The display response (on/off) time is determined by the pixel on/off time, because each pixel can be quickly charged and refreshed. Thus, the line to line scan delay can be eliminated.

Figure 11A:
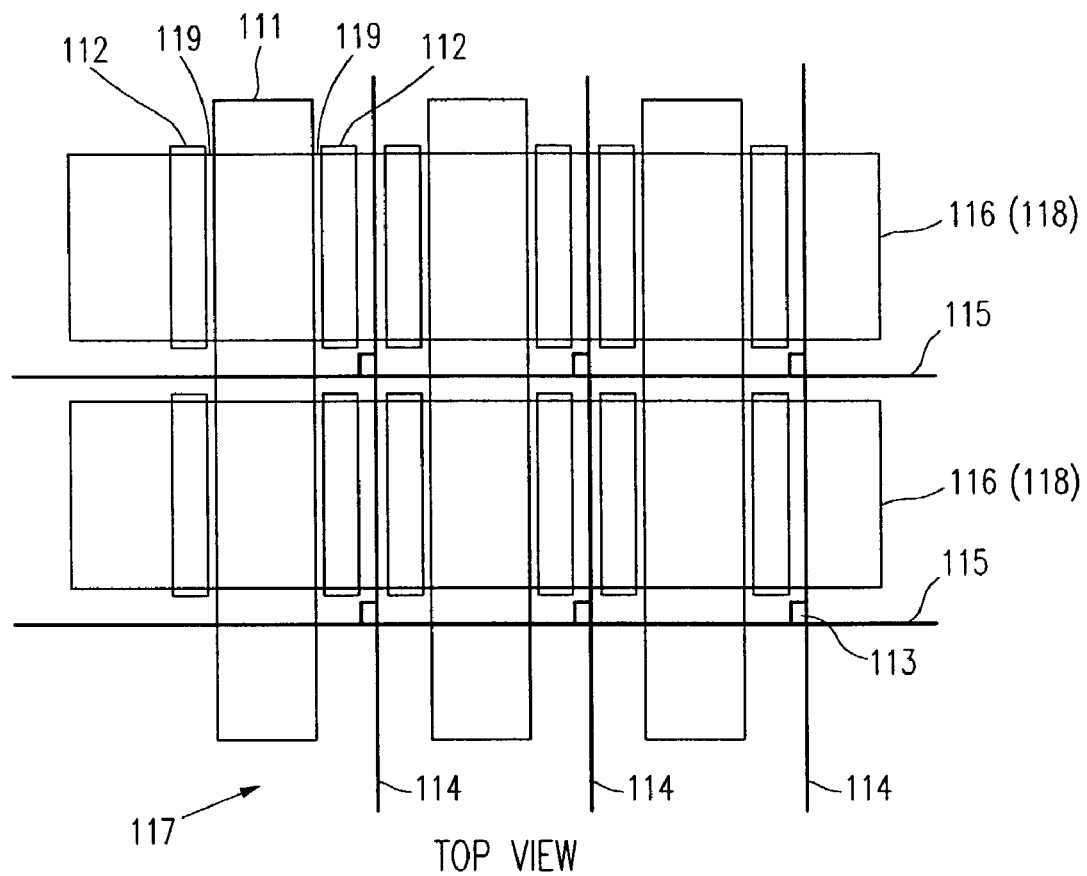
FIGS. 11A–11E illustrate the combination of the active and passive driving mechanisms.
Figure 11B:
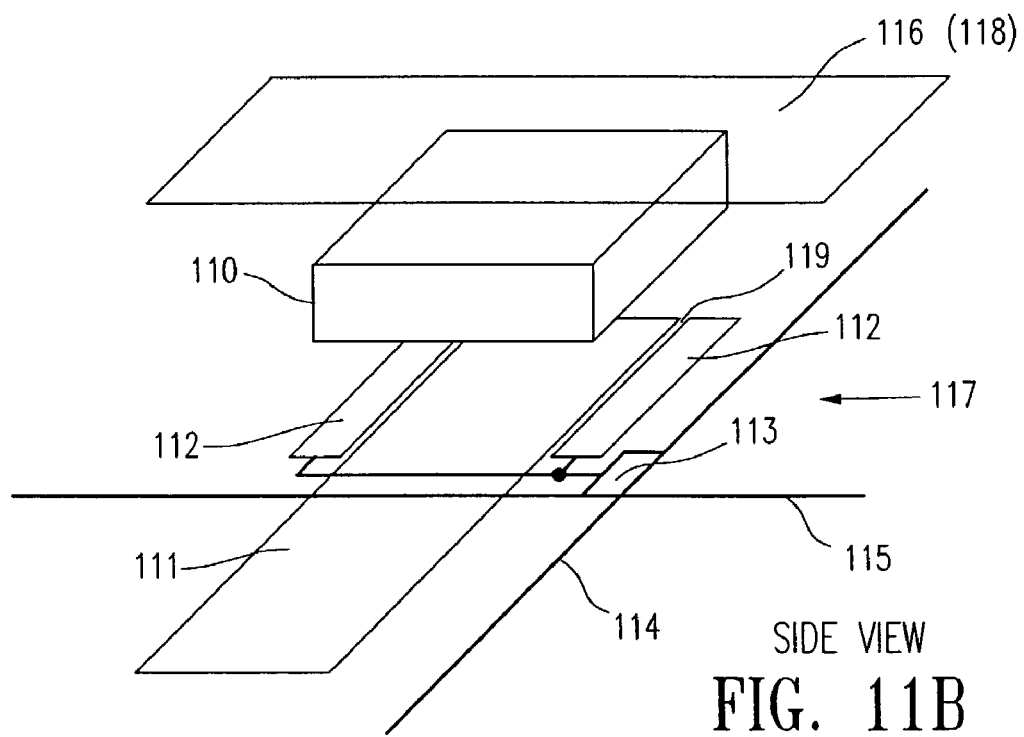

IV(c) Combination of Passive Matrix and TFT Active Matrix (1) Electrode Circuit Design In this novel design, both the passive matrix electrodes and the TFT active matrix are used in the driving electrode design. FIG. 11A shows the top view and FIG. 11B shows the side view of the driving circuit design. The bottom electrode layer (117) comprises the bottom column electrode (111) and in-plane electrodes (112). The in-plane electrodes of each cell is connected to the source of a TFT (113). The drain of the TFT is connected to a signal line (114) which runs vertically through the bottom surface of the device. The gate of the TFT is connected to a scan line (115) which runs horizontally through the bottom surface of the device. The scan and signal lines form a matrix structure, but the two types of lines are insulated from each other. The cells (110) are sandwiched between one top layer (116) and a bottom layer (117). The horizontal bars are the top row electrodes (118) that are transparent and run through the top of the cells (110). There is a gap (119) separating the two in-plane electrodes (112) and the column electrode (111). The cross section of the top row electrode, the bottom column electrode, and the in-plane electrodes define the display cell.

The top row electrodes (118) and bottom column electrodes (111) form the passive matrix which controls the movement of particles in the up and down direction. The in-plane electrodes (112) and the bottom column electrode (111) provide the bias voltage for the in-plane movement of the particles. The in-plane electrodes are controlled by the TFT active matrix.

(2) Driving Timing Sequences

To illustrate the dual mode switching of this invention, electrophoretic cells comprising a common black background and positively charged white particles dispersed in a clear colored solvent are used.

Figures 1, 11C:
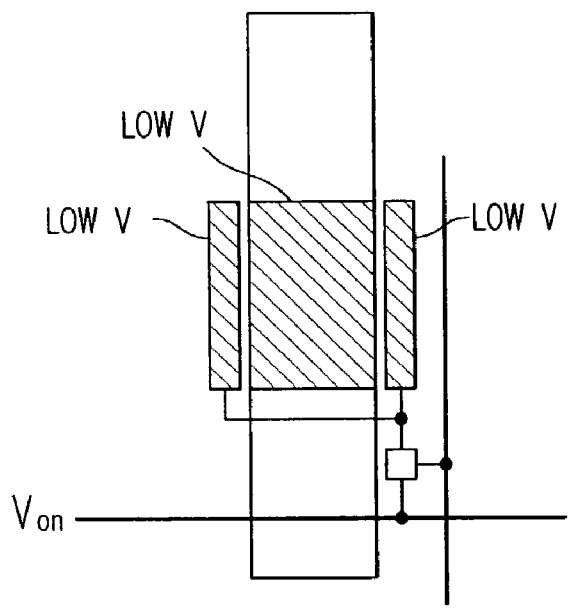
Figures 2, 11C:
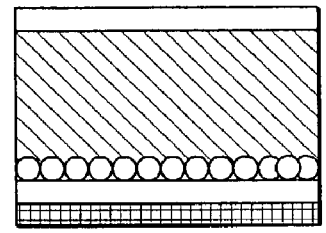

As illustrated in FIG. 11C, the scan signal is set at a voltage, Von, to turn on all the TFTs on the scanning row. Voltages at the signal lines are then switched to the in-plane electrodes. When the bottom column electrode and in-plane electrodes are both set at a low voltage and the top row electrode is set at a high voltage, particles in the cell move to the bottom surface of the cell. The bottom of the cells consequently is covered by the white particles and the color of the dielectric solvent (i.e., red, green or blue) is seen through the top transparent conductor layer.

Figures 1, 11D:
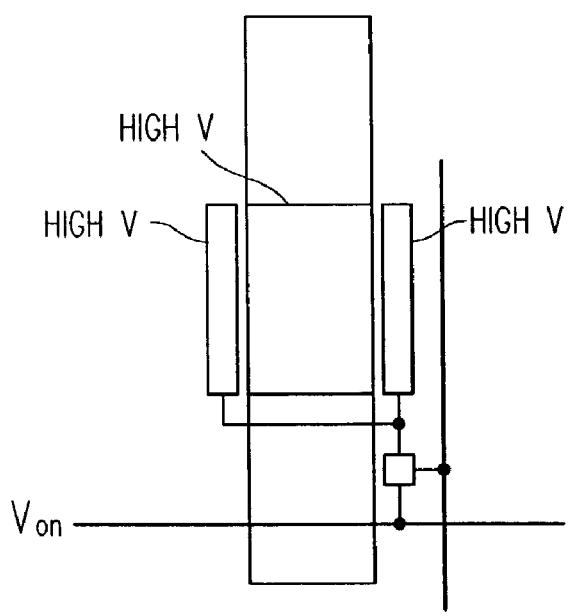
Figures 2, 11D:
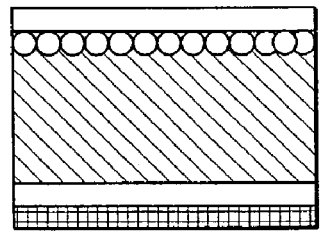

As illustrated in FIG. 11D, when the bottom electrode and in-plane electrodes are both set at a high voltage and the top row electrode is set at a low voltage, particles in the cell move to the top surface of the cell. When the white particles in the cell migrate to the top of the cell, the white color is seen from the top and the cell is in the white state.

Figures 1, 11E:
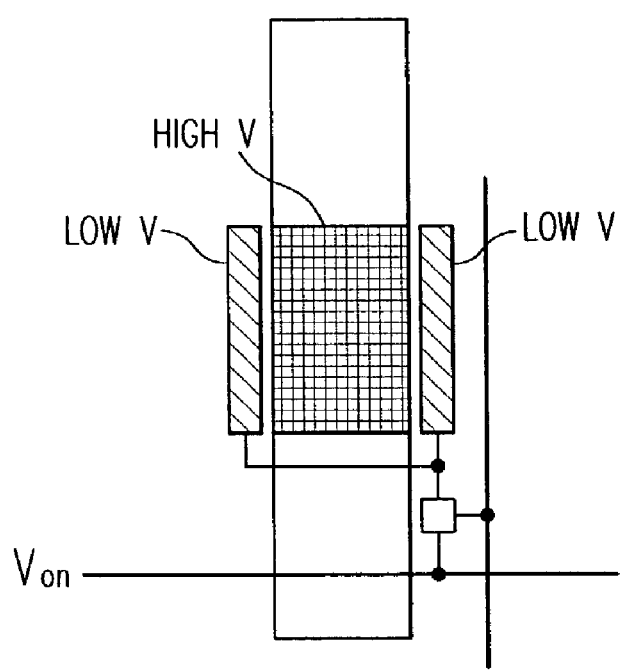
Figures 2, 11E:
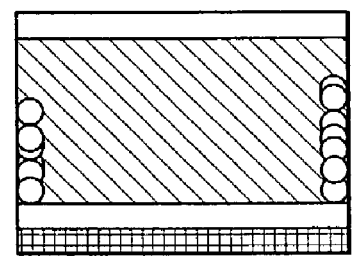

As illustrated in FIG. 11E, when the top row electrode and bottom column electrode are set at a high voltage and the in-plane electrodes are set at a low voltage, particles move to the area of the small in-plane electrodes, resulting in the black background color being seen through the top transparent conductor film.

This design has the advantage of reducing the in-plane switching time. As the in-plane electrodes are controlled by the TFTs, the signal capacitor holds the voltage on the in-plane electrodes. During the non-scan phase, the electrode with a voltage set by the signal capacitor continues to generate the electric field and control the movement of particles. This effectively reduces the cell switching time.

Figure 12A:
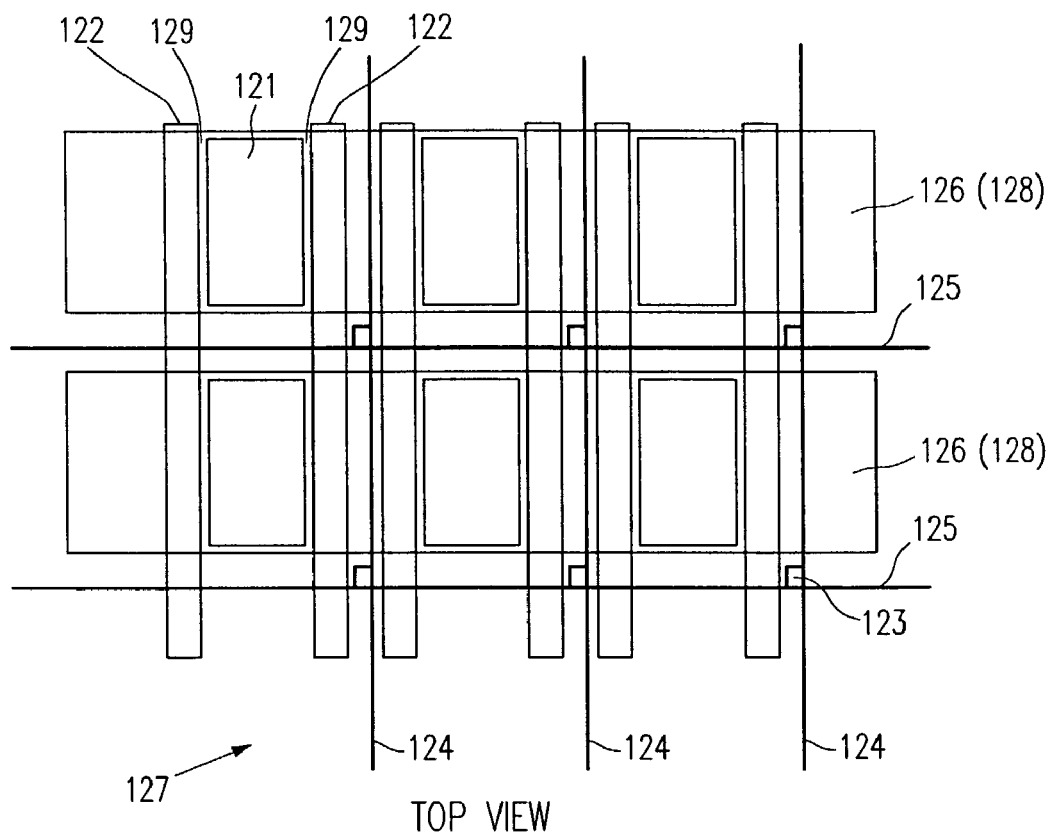
FIGS. 12A–12E illustrate an alternative combination of the active and passive driving mechanisms.
Figure 12B:
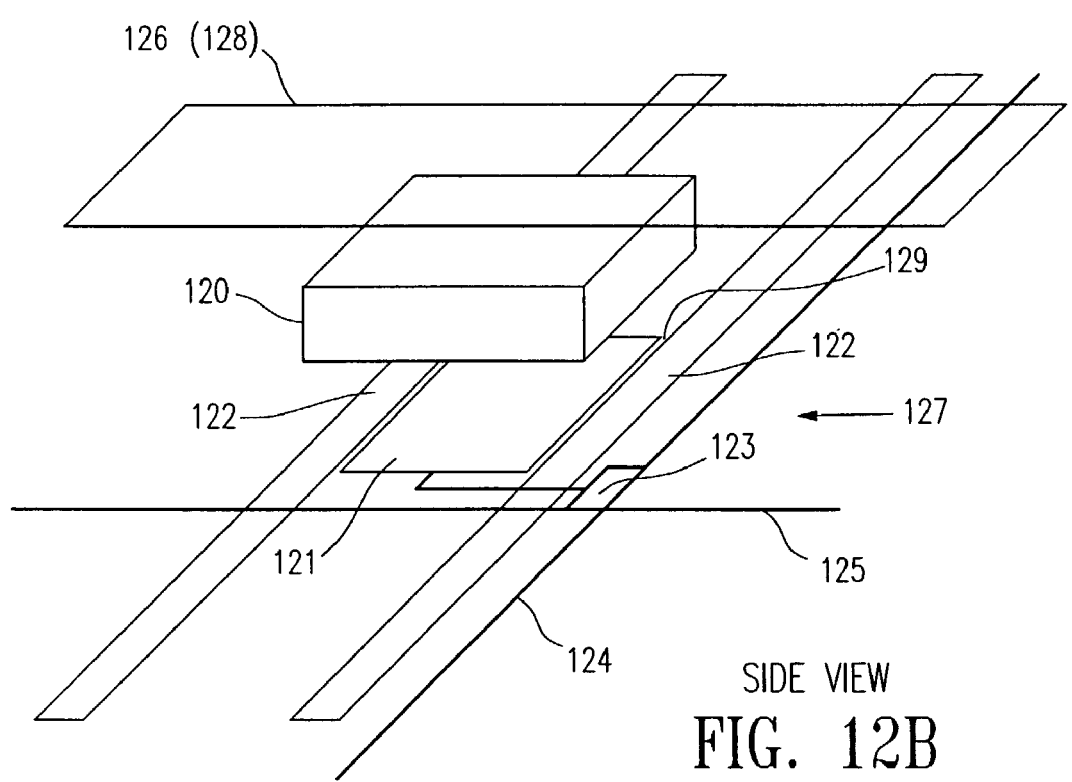

IV(d) Alternative Combination of Passive Matrix and TFT Active Matrix (1) Electrode Circuit Design In another novel design, both the passive matrix electrodes and TFT active matrix are used in the driving electrode design. FIG. 12A shows the top view and FIG. 12B shows the side view of the driving circuit design. The bottom electrode layer (127) comprises bottom column electrode (121) and in-plane electrode (122). The bottom electrode of each cell connects to the source of a TFT (123). The drain of the TFT connects to a signal line (124), which runs vertically through the bottom surface of the device. The gate of the TFT connects to a scan line (125), which runs horizontally through the bottom surface of the device. The scan and signal lines form a matrix structure, but they are insulated from each other. The cells (120) are sandwiched between a top layer (126) and a bottom layer (127). The horizontal bars are the top row electrodes (128) that are transparent and run through the top of the cells. There is a gap (129) separating the two in-plane electrodes (122) and the bottom electrode (121). The cross section of the top row electrode, the bottom electrode, and the in-plane electrodes define the display cell.

The top row electrodes and the in-plane electrodes form the passive matrix. The in-plane electrodes and the bottom electrode provide the bias voltage for the in-plane movement of the particles. The bottom electrodes are controlled by the TFT active matrix.

(2) Driving Timing Sequences

To illustrate the dual mode switching of this invention, electrophoretic cells comprising a common black background and positively charged white particles dispersed in a clear colored solvent are used.

Figures 1, 12C:
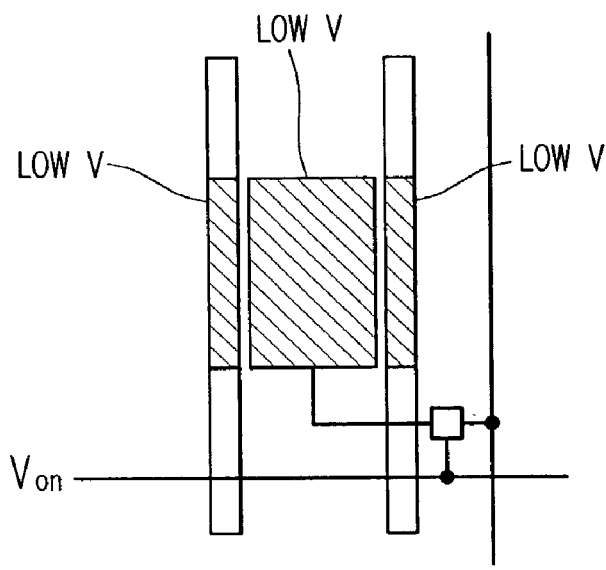
Figures 2, 12C:
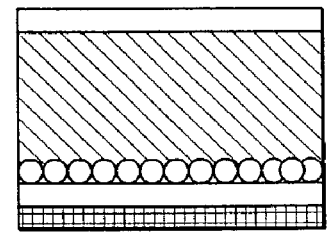

As illustrated in FIG. 12C, the scan signal is set at a voltage, Von, to turn on all the TFTs on the scanning row. Voltages at the signal lines are then switched to the bottom electrode. When the bottom electrode and in-plane electrodes are both set at a low voltage, and the top row electrode is set at a high voltage, particles in the cell move to the bottom surface of the cell. The bottom of the cells will be covered by the white particles and the color of the dielectric solvent (i.e., red, green or blue) is seen through the top transparent conductor layer.

Figures 1, 12D:
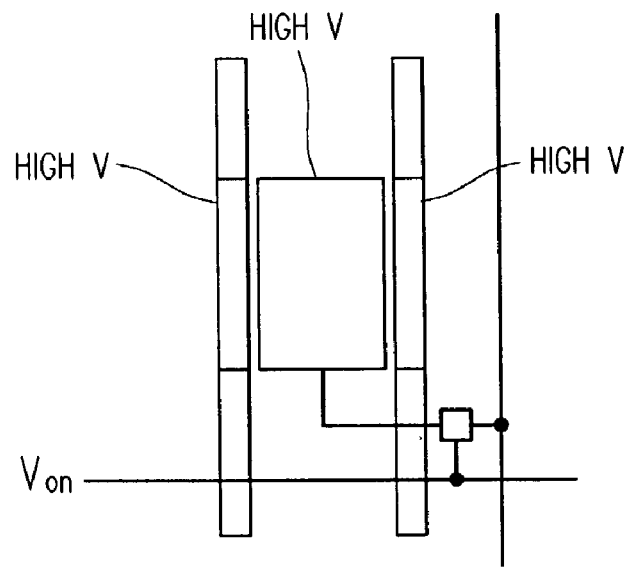
Figures 2, 12D:
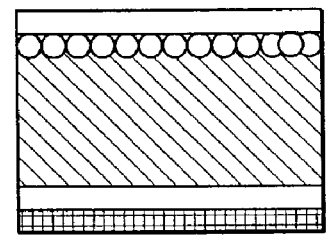

As illustrated in FIG. 12D, when the bottom electrode and in-plane electrodes are both set at a high voltage, and the top row electrode is set at a low voltage, particles in the cell move to the top surface of the cell. When the white particles in the cell migrate to the top of the cell, the resulting white color is seen from the top and the pixel is in the white state.

Figures 1, 12E:
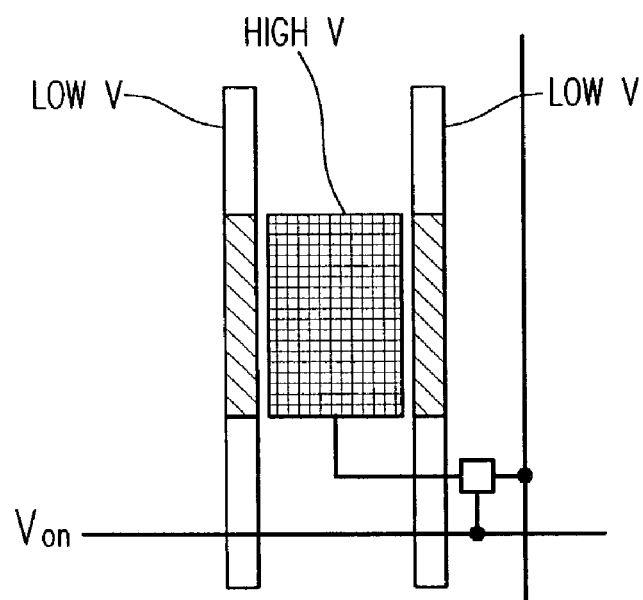
Figures 2, 12E:
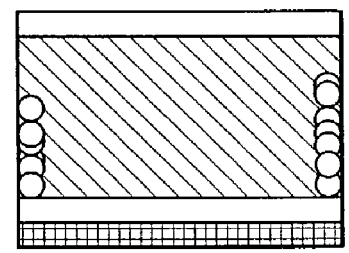

As illustrated in FIG. 12E, when the top row electrode and bottom column electrode are set at a high voltage, and the in-plane electrodes are set at a low voltage, particles move to the area of the small in-plane electrodes, resulting in the black background color being seen through the top transparent conductor film.

This design has the advantage of reducing the up-down switching time. As the bottom electrode is controlled by the TFTs, the signal capacitor holds the voltage on the bottom electrode. During the non-scan phase, the electrode with a voltage set by the signal capacitor continues to generate the electric field and control the movement of the particles. This effectively reduces the cell switching time.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. A process for the manufacture of an electrophoretic display comprising electrophoretic cells wherein each of said electrophoretic cells is capable of providing a three-color system, displaying the color of charged pigment particles, or the color of a dielectric solvent or solvent mixture or a background color, said process comprises:
   a) coating a radiation curable material over a top electrode layer;
   b) forming open electrophoretic cells on the radiation curable material by microembossing or imagewise exposure to radiation;
   c) filling the open electrophoretic cells with an electrophoretic composition comprising charged pigment particles dispersed in a dielectric solvent or solvent mixture and the charged pigment particles carry the same charge polarity and are of the same color;
   d) sealing the filled electrophoretic cells; and
   e) laminating the sealed electrophoretic cells with a layer comprising bottom electrodes and in-plane electrodes.

2. The process of claim 1 wherein step (e) is carried out with an adhesive layer.

3. An electrophoretic display comprising an array of electrophoretic cells wherein each of said electrophoretic cells comprises:
   a) a top layer comprising a top electrode,
   b) a bottom layer comprising a bottom electrode and at least one in-plane electrode, and
   c) an electrophoretic composition filled therein which electrophoretic composition comprises charged pigment particles dispersed in a dielectric solvent or solvent mixture and said charged pigment particles carry the same charge polarity and are of the same color, whereby each of said electrophoretic cells is capable of providing a three-color system, displaying the color of the charged pigment particles, or the color of the dielectric solvent or solvent mixture or a background color.

4. The electrophoretic display of claim 3 wherein said electrophoretic cells are prepared from microcups.

5. The electrophoretic display of claim 3 wherein said electrophoretic cells are prepared from microchannels.

6. The electrophoretic display of claim 3 wherein said electrophoretic cells are prepared from microcapsules.

7. The electrophoretic display of claim 3 wherein said bottom layer has one in-plane electrode.

8. The electrophoretic display of claim 3 wherein said bottom layer has two in-plane electrodes on the left and right sides of the layer respectively, with the bottom electrode between the two in-plane electrodes.

9. The electrophoretic display of claim 7 wherein there is a gap between the in-plane electrode and the bottom electrode.

10. The electrophoretic display of claim 8 wherein there are gaps separating the two in-plane electrodes from the bottom electrode.

11. The electrophoretic display of claim 3 wherein said charged pigment particles are white.

12. The electrophoretic display of claim 3 wherein said charged pigment particles are of a color selected from the group consisting of red, green, blue, yellow, cyan and magenta.

13. The electrophoretic display of claim 3 wherein said dielectric solvent or solvent mixture is of a color selected from the group consisting of red, green, blue, yellow, cyan and magenta.

14. The electrophoretic display of claim 3 wherein said bottom layer is of a color selected from the group consisting of black, red, green, blue, yellow, cyan and magenta.

15. The electrophoretic display of claim 3 further comprising a background layer which is on top of the bottom layer comprising the bottom electrode and the at least one in-plane electrode.

16. The electrophoretic display of claim 3 further comprising a background layer which is underneath the bottom layer comprising the bottom electrode and the at least one in-plane electrode.

17. The electrophoretic display of claim 3 further comprising a background layer which has a reflective surface.

18. The electrophoretic display of claim 3 wherein said background color is a color selected from the group consisting of black, red, green, blue, yellow, cyan and magenta.

19. The electrophoretic display of claim 3 wherein said electrophoretic display is a monochrome display.

20. The electrophoretic display of claim 19 wherein all said electrophoretic cells have white charged pigment particles.

21. The electrophoretic display of claim 19 wherein all said electrophoretic cells have charged pigment particles of the same color selected from the group consisting of red, green, blue, yellow, cyan and magenta.

22. The electrophoretic display of claim 19 wherein all said electrophoretic cells have the dielectric solvent or solvent mixture of the same color selected from the group consisting of red, green, blue, yellow, cyan and magenta.

23. The electrophoretic display of claim 19 wherein all said electrophoretic cells have the background color which is black.

24. The electrophoretic display of claim 19 wherein all said electrophoretic cells have the same background color selected from the group consisting of red, green, blue, cyan, yellow, magenta and a mixture thereof.

25. The electrophoretic display of claim 3 wherein said electrophoretic display is a multi-color display.

26. The electrophoretic display of claim 25 wherein said electrophoretic cells are filled with electrophoretic compositions comprising white charged pigment particles dispersed in dielectric solvents or solvent mixtures of different colors.

27. The electrophoretic display of claim 26 wherein said different colors are selected from the group consisting of red, green, blue, yellow, cyan and magenta.

28. The electrophoretic display of claim 27 wherein said different colors are red, green or blue.

29. The electrophoretic display of claim 25 wherein said background color is black.

30. The electrophoretic display of claim 3 wherein said top layer is colored or with a color filter.

31. The electrophoretic display of claim 30 wherein said electrophoretic cells are filled with an electrophoretic composition comprising white charged pigment particles dispersed in a colorless dielectric solvent or solvent mixture.

32. The electrophoretic display of claim 3 wherein said at least one in-plane electrode and said top and bottom electrodes are driven by active matrix systems.

33. The electrophoretic display of claim 32 wherein said active matrix system comprises TFTs.

34. The electrophoretic display of claim 32 wherein the bottom electrode is switched by a TFT and the at least one in-plane electrode is switched by another TFT.

35. The electrophoretic display of claim 34 wherein said TFTs are controlled by a matrix of scan lines and signal lines.

36. The electrophoretic display of claim 32 wherein the top electrode is a transparent conductive material.

37. The electrophoretic display of claim 3 wherein said at least one in-plane electrode and said top and bottom electrodes are driven by passive matrix systems.

38. The electrophoretic display of claim 37 wherein said electrophoretic cells are sandwiched between said top layer which is transparent and said bottom layer, and said top layer comprises a plurality of row electrodes and said bottom layer comprises a plurality of column electrodes and a plurality of in-plane electrodes.

39. The electrophoretic display of claim 38 wherein said row electrodes comprise horizontally oriented electrode bars which are transparent and run through the top of the electrophoretic cells in parallel.

40. The electrophoretic display of claim 38 wherein said column electrodes comprise vertically oriented electrode bars which are transparent and run through the bottom of the electrophoretic cells in parallel.

41. The electrophoretic display of claim 38 wherein said in-plane electrodes comprise vertically oriented electrode bars which are transparent and run through the bottom of the electrophoretic cells in parallel.

42. The electrophoretic display of claim 41 wherein said in-plane electrodes are positioned between column electrodes and aligned to the sides of electrophoretic cells.

43. The electrophoretic display of claim 3 wherein said in-plane electrodes are driven by an active matrix system and said top and bottom electrodes are driven by a passive matrix system.

44. The electrophoretic display of claim 43 wherein said active matrix system comprises TFTs.

45. The electrophoretic display of claim 3 wherein said in-plane electrodes are driven by a passive matrix system and said top and bottom electrodes are driven by an active matrix system.

46. The electrophoretic display of claim 45 wherein said active matrix system comprises TFTs.

47. The electrophoretic display of claim 3 wherein said charged pigment particles are positively charged.

48. The electrophoretic display of claim 3 wherein said charged pigment particles are negatively charged.

49. The electrophoretic display of claim 19 wherein said monochrome display further comprises highlight features.

50. The electrophoretic display of claim 3 wherein said electrophoretic cells are sealed with a sealing layer.

51. The electrophoretic display of claim 50 wherein said sealing layer is formed from a sealing composition having a specific gravity lower than that of said electrophoretic composition.

* * * * *